United States Patent
Wang et al.

(10) Patent No.: US 12,267,904 B2
(45) Date of Patent: Apr. 1, 2025

(54) COMMUNICATION METHOD, DEVICE, AND SYSTEM

(71) Applicant: Huawei Technologies Co., Ltd., Shenzhen (CN)

(72) Inventors: Rui Wang, Shanghai (CN); Wenjie Peng, Shanghai (CN); Mingzeng Dai, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/891,359

(22) Filed: Aug. 19, 2022

(65) Prior Publication Data
US 2022/0394804 A1 Dec. 8, 2022

Related U.S. Application Data

(63) Continuation of application No. PCT/CN2020/076084, filed on Feb. 20, 2020.

(51) Int. Cl.
*H04W 76/20* (2018.01)
*H04W 74/0833* (2024.01)
(Continued)

(52) U.S. Cl.
CPC ....... *H04W 76/20* (2018.02); *H04W 74/0841* (2013.01); *H04W 76/27* (2018.02); *H04W 76/30* (2018.02)

(58) Field of Classification Search
CPC ... H04W 4/60; H04W 74/0841; H04W 76/15; H04W 76/20; H04W 76/27; H04W 76/30;
(Continued)

(56) References Cited

U.S. PATENT DOCUMENTS 9,049,723 B2  6/2015  Dhanda et al.
11,432,262 B2  8/2022  Huang et al.
(Continued)

FOREIGN PATENT DOCUMENTS

CN  105191268 A  12/2015
CN  105210440 A  12/2015
(Continued)

OTHER PUBLICATIONS

"3rd Generation Partnership Project; Technical Specification Group Services and System Aspects; Study on Support for Multi-USIM Devices (Release 17)," 3GPP TR 22.834 V17.2.0, Dec. 2019, 17 pages.

(Continued)

*Primary Examiner* — Robert J Lopata
(74) *Attorney, Agent, or Firm* — SLATER MATSIL, LLP

(57) ABSTRACT

A communication method, a device, and a system, the method including sending, by a terminal device that supports a first user identity and a second user identity, first information to a first access network device using the first user identity, the first access network device being an access network device to which a first cell belongs, where the first cell is a primary cell in which the terminal device communicates with the first access network device by using the first user identity, where the second cell is a cell on which the terminal device camps using the second user identity, and the first indication information indicates that the first user identity and the second user identity that are supported by the terminal device share capabilities of the terminal device, and receiving first configuration information from the first access network device using the first user identity.

20 Claims, 13 Drawing Sheets

(51) Int. Cl.
*H04W 76/27* (2018.01)
*H04W 76/30* (2018.01)

(58) Field of Classification Search
CPC ....... H04W 76/34; H04W 8/183; H04W 8/24; H04W 88/06
USPC ......................................................... 370/329
See application file for complete search history.

(56) References Cited

U.S. PATENT DOCUMENTS

| | | |
|---|---|---|
| 2013/0244656 A1 | 9/2013 | Heo et al. |
| 2014/0273974 A1 | 9/2014 | Varghese et al. |
| 2017/0099621 A1 | 4/2017 | Michaelsen et al. |
| 2018/0152897 A1 | 5/2018 | Park |
| 2018/0359790 A1 | 12/2018 | Ingale et al. |
| 2020/0329523 A1* | 10/2020 | Yi .......................... H04W 72/51 |
| 2020/0351818 A1* | 11/2020 | Park ........................ H04W 4/90 |
| 2022/0256410 A1* | 8/2022 | Zhang ................... H04W 76/19 |

FOREIGN PATENT DOCUMENTS

| | | |
|---|---|---|
| WO | 2018053746 A1 | 3/2018 |
| WO | 2018141081 A1 | 8/2018 |
| WO | 2018171012 A1 | 9/2018 |

OTHER PUBLICATIONS

"Views on R17 MU-SIM," Agenda Item: 9.1.2, Source: Apple Inc., Document for: Discussion and Decision, 3GPP TSG-RAN Meeting #86, RP-193107 (revision of RP-192719), Sitges, Spain, Dec. 9-12, 2019, 4 pages.

* cited by examiner

COMMUNICATION METHOD, DEVICE, AND SYSTEM

CROSS-REFERENCE TO RELATED APPLICATIONS

This application is a continuation of International Application No. PCT/CN2020/076084, filed on Feb. 20, 2020, the disclosure of which is hereby incorporated by reference in its entirety.

TECHNICAL FIELD

This application relates to the communication field, and in particular, to a communication method, a device, and a system.

BACKGROUND

Currently, more terminal devices can support a dual-subscriber identity module (SIM) dual-standby operating mode. Dual-SIM dual-standby means that two SIM cards may be installed in a terminal device, and the two SIM cards may operate independently at the same time.

In a current technology, to enable the two SIM cards to operate independently, capabilities of the terminal device are rigidly divided into two parts, and the two parts are respectively allocated to the two SIM cards. For example, when the terminal device is equipped with two independent transceivers A and B, it may be specified that a SIM card A can use only the transceiver A, and a SIM card B can use only the transceiver B. Alternatively, when the terminal device is equipped with one transceiver, it may be specified that a SIM card A can use only a part of frequency bands supported by the transceiver, and a SIM card B can use only the remaining part of frequency bands. Although the existing rigid capability division manner can enable the two SIM cards to operate independently, a capability of the terminal device that can be used by each SIM card is limited.

Therefore, on the premise of ensuring that the two SIM cards can operate independently, how to allocate the capabilities of the terminal device to improve a data transmission speed of the terminal device is an urgent problem to be resolved currently.

SUMMARY

Embodiments of this application provide a communication method, a device, and a system, so that two SIM cards of a terminal device can use capabilities of the terminal device in a sharing manner.

To achieve the foregoing objective, the following technical solutions are used in embodiments of this application.

According to a first aspect, a communication method is provided. The communication method is applicable to a communication apparatus, the communication apparatus is, for example, a terminal device, and the terminal device supports a first user identity and a second user identity. The method includes sending, by using the first user identity, first information to a first access network device to which a first cell belongs, where the first cell is a primary cell in which the terminal device communicates with the first access network device by using the first user identity, the first information includes first indication information that is for indicating that the first user identity and the second user identity that are supported by the terminal device share capabilities of the terminal device, a frequency band combination list supported by the terminal device, a radio resource control (RRC) status of the terminal device in a second cell, and frequency band information of the second cell, and the second cell is a cell on which the terminal device camps by using the second user identity, and receiving first configuration information from the first access network device by using the first user identity, where the first configuration information includes information about a first secondary cell, and the first secondary cell is a secondary cell in which the terminal device communicates with the first access network device by using the first user identity. In this embodiment of this application, the terminal device may send the first information to the first access network device by using the first user identity. The first information includes the first indication information, the frequency band combination list supported by the terminal device, the RRC status of the terminal device in the second cell, and the frequency band information of the second cell. The first indication information may indicate that the two user identities supported by the terminal device can share the capabilities of the terminal device. The frequency band combination list supported by the terminal device may represent the capabilities of the terminal device. The RRC status of the terminal device in the second cell and the frequency band information of the second cell may represent a capability of the terminal device that is occupied by the second user identity. In this way, after receiving the first information, the first access network device may configure, for the terminal device based on the first information, the secondary cell for communicating with the first access network device by using the first user identity, so that the terminal device can occupy, by using the first user identity, a capability of the terminal device that is not occupied by the second user identity. Therefore, the capabilities of the terminal device are shared between the two user identities, and the capabilities of the terminal device are fully utilized. In other words, the communication method provided in this embodiment of this application can enable two SIM cards of the terminal device to use the capabilities of the terminal device in a sharing manner, and this avoids a limitation, in a current technology, of a rigid capability division manner on a capability of the terminal device that can be used by each SIM card, and can improve a data transmission speed of the terminal device.

In a possible implementation, the first secondary cell configured by the first access network device for the terminal device includes a third cell and/or a fourth cell, where a frequency band corresponding to the first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell.

Alternatively, in another possible implementation, the first secondary cell configured by the first access network device for the terminal device includes a fifth cell, where a frequency band corresponding to the fifth cell and a frequency band corresponding to the first cell are included in a second frequency band combination in the frequency band combination list, and the second frequency band combination does not include a frequency band corresponding to the second cell.

In a possible implementation, the first information may further include paging moment information used by a second access network device to send a paging message to the terminal device, and the second access network device is an access network device to which the second cell belongs.

Based on this solution, the first access network device may determine, based on the paging moment information, a paging moment at which the second access network device sends the paging message to the terminal device, to avoid the paging message sent by the second access network device to the terminal device, so that the terminal device can receive the paging message from the second access network device by using the second user identity.

In a possible implementation, the method further includes receiving second indication information from the first access network device by using the first user identity, where the second indication information is for indicating the terminal device to stop monitoring a physical downlink control channel at a first paging moment by using the first user identity, and the first paging moment is a paging moment indicated by the paging moment information. Alternatively, the method further includes receiving monitoring configuration information from the first access network device by using the first user identity, where the monitoring configuration information is for indicating a time domain resource and/or a frequency domain resource on which the terminal device monitors the paging message, and the monitoring configuration information is determined based on the paging moment information. Based on this solution, when a conflicting secondary cell that conflicts with the second cell exists in the first secondary cell configured by the first access network device for the terminal device, the terminal device can receive the paging message from the second access network device in the second cell by using the second user identity.

In a possible implementation, the method further includes sending frequency band information of a sixth cell to the first access network device by using the first user identity, where the sixth cell is a cell on which the terminal device camps after performing cell reselection by using the second user identity, and receiving second configuration information from the first access network device by using the first user identity, where the second configuration information includes information about a second secondary cell, and the second secondary cell is a secondary cell in which the terminal device communicates with the first access network device by using the first user identity. Based on this solution, after the terminal device performs cell reselection by using the second user identity, the first access network device may reconfigure, for the terminal device, the secondary cell for communicating with the first access network device by using the first user identity.

In a possible implementation, the method further includes sending a first message to the first access network device by using the first user identity, where the first message is for requesting to randomly access the second cell by using the second user identity, receiving a second message from the first access network device by using the first user identity, where the second message is for indicating the terminal device to deactivate or release a conflicting secondary cell by using the first user identity, and the conflicting secondary cell is one or more cells, in the first secondary cell, that conflict with the second cell, and deactivating or releasing the conflicting secondary cell based on the second message by using the first user identity. Based on this solution, even if the secondary cell configured by the first access network device for the terminal device conflicts with the second cell on which the terminal device camps by using the second user identity, the terminal device can still initiate random access in the second cell by using the second user identity.

In a possible implementation, the first message includes third indication information, and the third indication information is for indicating a reason for initiating random access and/or duration in which the terminal device communicates with the second access network device by using the second user identity. Based on the third indication information, the first access network device may determine whether the terminal device requires a continuous uplink/downlink capability, to determine to deactivate or release the conflicting secondary cell.

In a possible implementation, the releasing the conflicting secondary cell by using the first user identity includes when a first timer or a second timer expires, releasing the conflicting secondary cell by using the first user identity. The first timer is configured based on the second message, and configuration information of the second timer is predefined. Based on this solution, the terminal device may release the conflicting secondary cell after a period of time.

In a possible implementation, the second message includes first time information, and the first time information is for indicating time information used by the terminal device to deactivate the conflicting secondary cell by using the first user identity. Based on this solution, the terminal device may deactivate, based on the time information indicated by the first time information, the conflicting secondary cell in time by using the first user identity.

In a possible implementation, the method further includes sending a third message to the first access network device by using the first user identity, where the third message is for indicating that the terminal device is in an RRC connected state by using the second user identity, receiving third configuration information from the first access network device by using the first user identity, where the third configuration information is for updating the secondary cell in which the terminal device communicates with the first access network device by using the first user identity, and sending the third configuration information to the second access network device by using the second user identity, and receiving fourth configuration information from the second access network device, where the fourth configuration information includes information about a secondary cell in which the terminal device communicates with the second access network device by using the second user identity. Based on this solution, the first access network device and the second access network device may negotiate, through the terminal device, capabilities of the terminal device, so that the two user identities of the terminal device share the capabilities of the terminal device.

In a possible implementation, the third message may include frequency band information and power information that are required by the second access network device. Further, before the sending a third message to the first access network device by using the first user identity, the method further includes sending fifth configuration information to the second access network device by using the second user identity, where the fifth configuration information includes information about a serving cell in which the terminal device communicates with the first access network device by using the first user identity, and receiving a fourth message from the second access network device by using the second user identity, where the fourth message includes the frequency band information and/or the power information that are/is required by the second access network device. Based on this solution, when receiving the third message, the first access network device may update, based on the frequency band information and the power information that are required by the second access network device, the information about the secondary cell configured for the terminal device.

In a possible implementation, the method further includes sending fourth indication information to the first access network device by using the first user identity, where the fourth indication information is for indicating that the terminal device is in an RRC idle state by using the second user identity. Based on this solution, when the terminal device is in the RRC idle state by using the second user identity, the terminal device may perform reporting to the first access network device in time, so that the first access network device reconfigures a secondary cell for the terminal device in time.

In a possible implementation, the method further includes when the terminal device enters an RRC inactive state by using the second user identity, storing, by using the second user identity, the information about the serving cell in which the terminal device communicates with the first access network device by using the first user identity. Based on this solution, when the terminal device enters the RRC connected state by using the second user identity, the corresponding access network device may configure a corresponding serving cell for the terminal device based on the information, stored in a context of the terminal device, about the serving cell in which the terminal device communicates with the first access network device by using the first user identity. Therefore, the terminal device does not need to transmit the information through an air interface, and time required for the terminal device to enter the connected state by using the second user identity can be reduced.

In a possible implementation, the method further includes receiving sixth configuration information from the second access network device by using the second user identity, where the sixth configuration information is for configuring a seventh cell as a secondary cell in which the terminal device communicates with the second access network device by using the second user identity, and sending a fifth message to the second access network device, where the fifth message is for indicating that the seventh cell is not validated. To be specific, after receiving information about a secondary cell configured by the access network device for the terminal device, the terminal device does not validate a secondary cell that conflicts with a configured cell, and reports, to a network side, the secondary cell that is not validated. Based on this solution, a conflict between capabilities of the terminal device that are occupied by the two SIM cards can be avoided.

According to a second aspect, a communication method is provided. The communication method is applicable to a communication apparatus, and the communication apparatus is, for example, a first access network device. The method includes receiving first information from a terminal device, where the first information includes first indication information, a frequency band combination list supported by the terminal device, a radio resource control RRC status of the terminal device in a second cell, and frequency band information of the second cell, configuring a first secondary cell for the terminal device based on the first information, where the first secondary cell is a secondary cell in which the terminal device communicates with the first access network device by using a first user identity, and sending first configuration information to the terminal device, where the first configuration information includes information about the first secondary cell. The terminal device supports the first user identity and a second user identity, the second cell is a cell on which the terminal device camps by using the second user identity, and the first indication information is for indicating that the first user identity and the second user identity that are supported by the terminal device share capabilities of the terminal device. In this embodiment of this application, the first access network device may receive the first information from the terminal device. The first information includes the first indication information, the frequency band combination list supported by the terminal device, the RRC status of the terminal device in the second cell, and the frequency band information of the second cell. The first indication information may indicate that the two user identities supported by the terminal device can share the capabilities of the terminal device. The frequency band combination list supported by the terminal device may represent the capabilities of the terminal device. The RRC status of the terminal device in the second cell and the frequency band information of the second cell may represent a capability of the terminal device that is occupied by the second user identity. Further, the first access network device may configure, for the terminal device based on the first information, the secondary cell for communicating with the first access network device by using the first user identity, so that the terminal device can occupy, by using the first user identity, a capability of the terminal device that is not occupied by the second user identity. Therefore, the capabilities of the terminal device are shared between the two user identities, and the capabilities of the terminal device are fully utilized. In other words, the communication method provided in this embodiment of this application can enable two SIM cards of the terminal device to use the capabilities of the terminal device in a sharing manner, and this avoids a limitation, in a current technology, of a rigid capability division manner on a capability of the terminal device that can be used by each SIM card, and can improve a data transmission speed of the terminal device.

In a possible implementation, the first secondary cell includes a third cell and/or a fourth cell, where a frequency band corresponding to a first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell.

Alternatively, in another possible implementation, the first secondary cell includes a fifth cell, where a frequency band corresponding to the fifth cell and a frequency band corresponding to a first cell are included in a second frequency band combination in the frequency band combination list, and the second frequency band combination does not include a frequency band corresponding to the second cell.

In a possible implementation, the first information further includes paging moment information used by a second access network device to send a paging message to the terminal device, and the second access network device is an access network device to which the second cell belongs.

In a possible implementation, the method further includes stopping, at a first paging moment, performing downlink scheduling for the terminal device in a conflicting secondary cell, where the first paging moment is a paging moment indicated by the paging moment information, and the conflicting secondary cell is one or more cells, in the first secondary cell, that conflict with the second cell. Alternatively, the method further includes sending second indication information to the terminal device, where the second indication information is for indicating the terminal device to stop monitoring a physical downlink control channel at a first paging moment by using the first user identity. Alternatively, the method further includes sending monitoring configuration information to the terminal device, where the monitoring configuration information is for indicating a time domain resource and/or a frequency domain resource on which the terminal device monitors the paging message, and the monitoring configuration information is determined based on the paging moment information.

In a possible implementation, the method further includes receiving frequency band information of a sixth cell from the terminal device, where the sixth cell is a cell on which the terminal device camps after performing cell reselection by using the second user identity, configuring a second secondary cell for the terminal device based on the frequency band information of the sixth cell, where the second secondary cell is a secondary cell in which the terminal device communicates with the first access network device by using the first user identity, and sending second configuration information to the terminal device, where the second configuration information includes information about the second secondary cell.

In a possible implementation, the method further includes receiving a first message from the terminal device, where the first message is for requesting to randomly access the second cell by using the second user identity, and deactivating or releasing the conflicting secondary cell, and sending a second message to the terminal device, where the second message is for indicating the terminal device to deactivate or release the conflicting secondary cell by using the first user identity, and the conflicting secondary cell is the one or more cells, in the first secondary cell, that conflict with the second cell.

In a possible implementation, the first message includes third indication information, and the third indication information is for indicating a reason for initiating random access and/or duration in which the terminal device communicates with the second access network device by using the second user identity.

In a possible implementation, before the deactivating or releasing the conflicting secondary cell, the method further includes determining, based on the third indication information, to deactivate or release the conflicting secondary cell.

In a possible implementation, the releasing the conflicting secondary cell includes when a first timer or a second timer expires, releasing the conflicting secondary cell, where the first timer is configured based on the second message, and configuration information of the second timer is predefined.

In a possible implementation, the second message includes first time information, and the first time information is for indicating time information used by the terminal device to deactivate the conflicting secondary cell by using the first user identity.

In a possible implementation, the method further includes receiving a third message from the terminal device, where the third message is for indicating that the terminal device is in an RRC connected state by using the second user identity, and determining third configuration information based on the third message, and sending the third configuration information to the terminal device, where the third configuration information is for updating the secondary cell in which the terminal device communicates with the first access network device by using the first user identity.

In a possible implementation, the method further includes receiving fourth indication information from the terminal device, where the fourth indication information is for indicating that the terminal device is in an RRC idle state by using the second user identity.

In a possible implementation, the method further includes determining that the terminal device enters an RRC inactive state by using the second user identity, and storing information about a serving cell in which the terminal device communicates with the first access network device by using the first user identity.

For technical effects of the possible implementations of the second aspect, refer to the descriptions of the technical effects of the corresponding implementations of the first aspect.

According to a third aspect, a communication apparatus is provided. The communication apparatus supports a first user identity and a second user identity, and is configured to perform the method according to any one of the first aspect or the possible implementations of the first aspect. For example, the communication apparatus may be a communication device, or a chip or another component disposed in the communication device. For example, the communication device is the terminal device described above. An example in which the communication apparatus is the terminal device is used below. Specifically, the terminal device may include modules configured to perform the method according to any one of the first aspect or the possible implementations of the first aspect, for example, include a processing module and a transceiver module.

The processing module is configured to obtain first information, where the first information includes first indication information, a frequency band combination list supported by the terminal device, an RRC status of the terminal device in a second cell, and frequency band information of the second cell, the second cell is a cell on which the terminal device camps by using the second user identity, and the first indication information is for indicating that the first user identity and the second user identity that are supported by the terminal device share capabilities of the terminal device. The transceiver module is configured to send the first information to a first access network device by using the first user identity, where the first access network device is an access network device to which a first cell belongs, and the first cell is a primary cell in which the terminal device communicates with the first access network device by using the first user identity. The transceiver module is further configured to receive first configuration information from the first access network device by using the first user identity, where the first configuration information includes information about a first secondary cell, and the first secondary cell is a secondary cell in which the terminal device communicates with the first access network device by using the first user identity.

In a possible implementation, the first secondary cell includes a third cell and/or a fourth cell, where a frequency band corresponding to the first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell, or the first secondary cell includes a fifth cell, where a frequency band corresponding to the fifth cell and a frequency band corresponding to the first cell are included in a second frequency band combination in the frequency band combination list, and the second frequency band combination does not include a frequency band corresponding to the second cell.

In a possible implementation, the first information may further include paging moment information used by a second access network device to send a paging message to the terminal device, and the second access network device is an access network device to which the second cell belongs.

In a possible implementation, the transceiver module is further configured to receive second indication information from the first access network device by using the first user identity, where the second indication information is for indicating the terminal device to stop monitoring a physical downlink control channel at a first paging moment by using the first user identity, and the first paging moment is a paging moment indicated by the paging moment information. Alternatively, the transceiver module is further configured to receive monitoring configuration information from the first access network device by using the first user identity, where the monitoring configuration information is for indicating a time domain resource and/or a frequency domain resource on which the terminal device monitors the paging message, and the monitoring configuration information is determined based on the paging moment information.

In a possible implementation, the transceiver module is further configured to send frequency band information of a sixth cell to the first access network device by using the first user identity, where the sixth cell is a cell on which the terminal device camps after performing cell reselection by using the second user identity, and the transceiver module is further configured to receive second configuration information from the first access network device by using the first user identity, where the second configuration information includes information about a second secondary cell, and the second secondary cell is a secondary cell in which the terminal device communicates with the first access network device by using the first user identity.

In a possible implementation, the transceiver module is further configured to send a first message to the first access network device by using the first user identity, where the first message is for requesting to randomly access the second cell by using the second user identity, the transceiver module is further configured to receive a second message from the first access network device by using the first user identity, where the second message is for indicating the terminal device to deactivate or release a conflicting secondary cell by using the first user identity, and the conflicting secondary cell is one or more cells, in the first secondary cell, that conflict with the second cell, and the processing module is further configured to deactivate or release the conflicting secondary cell based on the second message by using the first user identity.

In a possible implementation, the first message includes third indication information, and the third indication information is for indicating a reason for initiating random access and/or duration in which the terminal device communicates with the second access network device by using the second user identity.

In a possible implementation, that the processing module is further configured to release the conflicting secondary cell by using the first user identity includes When a first timer or a second timer expires, the processing module is configured to release the conflicting secondary cell by using the first user identity, where the first timer is configured based on the second message, and configuration information of the second timer is predefined.

In a possible implementation, the second message includes first time information, and the first time information is for indicating time information used by the terminal device to deactivate the conflicting secondary cell by using the first user identity.

In a possible implementation, the transceiver module is further configured to send a third message to the first access network device by using the first user identity, where the third message is for indicating that the terminal device is in an RRC connected state by using the second user identity, the transceiver module is further configured to receive third configuration information from the first access network device by using the first user identity, where the third configuration information is for updating the secondary cell in which the terminal device communicates with the first access network device by using the first user identity, and the transceiver module is further configured to send the third configuration information to the second access network device by using the second user identity, and receive fourth configuration information from the second access network device, where the fourth configuration information includes information about a secondary cell in which the terminal device communicates with the second access network device by using the second user identity.

In a possible implementation, the third message includes frequency band information and power information that are required by the second access network device, the transceiver module is further configured to before sending the third message to the first access network device by using the first user identity, send fifth configuration information to the second access network device by using the second user identity, where the fifth configuration information includes information about a serving cell in which the terminal device communicates with the first access network device by using the first user identity, and the transceiver module is further configured to receive a fourth message from the second access network device by using the second user identity, where the fourth message includes the frequency band information and/or the power information that are/is required by the second access network device.

In a possible implementation, the transceiver module is further configured to send fourth indication information to the first access network device by using the first user identity, where the fourth indication information is for indicating that the terminal device is in an RRC idle state by using the second user identity.

In a possible implementation, the processing module is further configured to when the terminal device enters an RRC inactive state by using the second user identity, store, by using the second user identity, the information about the serving cell in which the terminal device communicates with the first access network device by using the first user identity.

In a possible implementation, the transceiver module is further configured to receive sixth configuration information from the second access network device by using the second user identity, where the sixth configuration information is for configuring a seventh cell as a secondary cell in which the terminal device communicates with the second access network device by using the second user identity, and the transceiver module is further configured to send a fifth message to the second access network device, where the fifth message is for indicating that the seventh cell is not validated.

For technical effects of the third aspect or the possible implementations of the third aspect, refer to the descriptions of the technical effects of the first aspect or the corresponding implementations of the first aspect.

According to a fourth aspect, a communication apparatus is provided. The communication apparatus is configured to perform the method according to any one of the second aspect or the possible implementations of the second aspect. For example, the communication apparatus may be a communication device, or a chip or another component disposed in the communication device. For example, the communication device is the first access network device described above. An example in which the communication apparatus is the first access network device is used below. Specifically, the first access network device may include modules configured to perform the method according to any one of the second aspect or the possible implementations of the second aspect, for example, include a processing module and a transceiver module.

The transceiver module is configured to receive first information from a terminal device, where the first information includes first indication information, a frequency band combination list supported by the terminal device, a radio resource control RRC status of the terminal device in a second cell, and frequency band information of the second cell, the terminal device supports a first user identity and a second user identity, the second cell is a cell on which the terminal device camps by using the second user identity, and the first indication information is for indicating that the first user identity and the second user identity that are supported by the terminal device share capabilities of the terminal device. The processing module is adapted to configure a first secondary cell for the terminal device based on the first information, where the first secondary cell is a secondary cell in which the terminal device communicates with the first access network device by using the first user identity. The transceiver module is further configured to send first configuration information to the terminal device, where the first configuration information includes information about the first secondary cell.

In a possible implementation, the first secondary cell includes a third cell and/or a fourth cell, where a frequency band corresponding to a first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell, or the first secondary cell includes a fifth cell, where a frequency band corresponding to the fifth cell and a frequency band corresponding to a first cell are included in a second frequency band combination in the frequency band combination list, and the second frequency band combination does not include a frequency band corresponding to the second cell.

In a possible implementation, the first information further includes paging moment information used by a second access network device to send a paging message to the terminal device, and the second access network device is an access network device to which the second cell belongs.

In a possible implementation, the processing module is further configured to stop, at a first paging moment, performing downlink scheduling for the terminal device in a conflicting secondary cell, where the first paging moment is a paging moment indicated by the paging moment information, and the conflicting secondary cell is one or more cells, in the first secondary cell, that conflict with the second cell. Alternatively, the transceiver module is further configured to send second indication information to the terminal device, where the second indication information is for indicating the terminal device to stop monitoring a physical downlink control channel at a first paging moment by using the first user identity. Alternatively, the transceiver module is further configured to send monitoring configuration information to the terminal device, where the monitoring configuration information is for indicating a time domain resource and/or a frequency domain resource on which the terminal device monitors the paging message, and the monitoring configuration information is determined based on the paging moment information.

In a possible implementation, the transceiver module is further configured to receive frequency band information of a sixth cell from the terminal device, where the sixth cell is a cell on which the terminal device camps after performing cell reselection by using the second user identity, the processing module is further adapted to configure a second secondary cell for the terminal device based on the frequency band information of the sixth cell, where the second secondary cell is a secondary cell in which the terminal device communicates with the first access network device by using the first user identity, and the transceiver module is further configured to send second configuration information to the terminal device, where the second configuration information includes information about the second secondary cell.

In a possible implementation, the transceiver module is further configured to receive a first message from the terminal device, where the first message is for requesting to randomly access the second cell by using the second user identity, the processing module is further configured to deactivate or release the conflicting secondary cell, where the conflicting secondary cell is the one or more cells, in the first secondary cell, that conflict with the second cell, and the transceiver module is further configured to send a second message to the terminal device, where the second message is for indicating the terminal device to deactivate or release the conflicting secondary cell by using the first user identity.

In a possible implementation, the first message includes third indication information, and the third indication information is for indicating a reason for initiating random access and/or duration in which the terminal device communicates with the second access network device by using the second user identity, and the processing module is further configured to before deactivating or releasing the conflicting secondary cell, determine, based on the third indication information, to deactivate or release the conflicting secondary cell.

In a possible implementation, that the processing module is further configured to release the conflicting secondary cell includes when a first timer or a second timer expires, the processing module is configured to release the conflicting secondary cell, where the first timer is configured based on the second message, and configuration information of the second timer is predefined.

In a possible implementation, the second message includes first time information, and the first time information is for indicating time information used by the terminal device to deactivate the conflicting secondary cell by using the first user identity.

In a possible implementation, the transceiver module is further configured to receive a third message from the terminal device, where the third message is for indicating that the terminal device is in an RRC connected state by using the second user identity, and the processing module is further configured to determine third configuration information based on the third message, and send the third configuration information to the terminal device, where the third configuration information is for updating the secondary cell in which the terminal device communicates with the first access network device by using the first user identity.

In a possible implementation, the transceiver module is further configured to receive fourth indication information from the terminal device, where the fourth indication information is for indicating that the terminal device is in an RRC idle state by using the second user identity.

In a possible implementation, the processing module is further configured to determine that the terminal device enters an RRC inactive state by using the second user identity, and store information about a serving cell in which the terminal device communicates with the first access network device by using the first user identity.

For technical effects of the fourth aspect or the possible implementations of the fourth aspect, refer to the descriptions of the technical effects of the second aspect or the corresponding implementations of the second aspect.

According to a fifth aspect, a communication apparatus is provided. The communication apparatus includes a processor and a transceiver. The processor and the transceiver are coupled to each other, and are configured to implement the method according to any one of the foregoing aspects or the possible implementations of the foregoing aspects. Optionally, the communication apparatus may further include a memory. The processor, the memory, and the transceiver are coupled to each other, and are configured to implement the method according to any one of the foregoing aspects or the possible implementations of the foregoing aspects. For example, the communication apparatus may be a communication device, or a chip or another component disposed in the communication device. If the communication apparatus is the communication device, the transceiver is implemented by using, for example, an antenna, a feeder, and a codec in the communication device. Alternatively, if the communication apparatus is the chip disposed in the communication device, the transceiver is, for example, a communication interface in the chip, and the communication interface is connected to a radio frequency transceiver component in the communication device, to implement information receiving and sending through the radio frequency transceiver component.

When the communication apparatus is configured to perform the method according to any one of the first aspect or the possible implementations of the first aspect, the communication apparatus may be, for example, the terminal device described above, and the terminal device may include, for example, a transceiver and a processor. The processor is configured to obtain first information, where the first information includes first indication information, a frequency band combination list supported by the terminal device, an RRC status of the terminal device in a second cell, and frequency band information of the second cell, the second cell is a cell on which the terminal device camps by using a second user identity, and the first indication information is for indicating that a first user identity and the second user identity that are supported by the terminal device share capabilities of the terminal device. The transceiver is configured to send the first information to a first access network device by using the first user identity, where the first access network device is an access network device to which a first cell belongs, and the first cell is a primary cell in which the terminal device communicates with the first access network device by using the first user identity. The transceiver is further configured to receive first configuration information from the first access network device by using the first user identity, where the first configuration information includes information about a first secondary cell, and the first secondary cell is a secondary cell in which the terminal device communicates with the first access network device by using the first user identity.

In a possible implementation, the first secondary cell includes a third cell and/or a fourth cell, where a frequency band corresponding to the first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell, or the first secondary cell includes a fifth cell, where a frequency band corresponding to the fifth cell and a frequency band corresponding to the first cell are included in a second frequency band combination in the frequency band combination list, and the second frequency band combination does not include a frequency band corresponding to the second cell.

In a possible implementation, the first information may further include paging moment information used by a second access network device to send a paging message to the terminal device, and the second access network device is an access network device to which the second cell belongs.

In a possible implementation, the transceiver is further configured to receive second indication information from the first access network device by using the first user identity, where the second indication information is for indicating the terminal device to stop monitoring a physical downlink control channel at a first paging moment by using the first user identity, and the first paging moment is a paging moment indicated by the paging moment information. Alternatively, the transceiver is further configured to receive monitoring configuration information from the first access network device by using the first user identity, where the monitoring configuration information is for indicating a time domain resource and/or a frequency domain resource on which the terminal device monitors the paging message, and the monitoring configuration information is determined based on the paging moment information.

In a possible implementation, the transceiver is further configured to send frequency band information of a sixth cell to the first access network device by using the first user identity, where the sixth cell is a cell on which the terminal device camps after performing cell reselection by using the second user identity, and the transceiver is further configured to receive second configuration information from the first access network device by using the first user identity, where the second configuration information includes information about a second secondary cell, and the second secondary cell is a secondary cell in which the terminal device communicates with the first access network device by using the first user identity.

In a possible implementation, the transceiver is further configured to send a first message to the first access network device by using the first user identity, where the first message is for requesting to randomly access the second cell by using the second user identity, the transceiver is further configured to receive a second message from the first access network device by using the first user identity, where the second message is for indicating the terminal device to deactivate or release a conflicting secondary cell by using the first user identity, and the conflicting secondary cell is one or more cells, in the first secondary cell, that conflict with the second cell, and the processor is further configured to deactivate or release the conflicting secondary cell based on the second message by using the first user identity.

In a possible implementation, the first message includes third indication information, and the third indication information is for indicating a reason for initiating random access and/or duration in which the terminal device communicates with the second access network device by using the second user identity.

In a possible implementation, that the processor is further configured to release the conflicting secondary cell by using the first user identity includes when a first timer or a second timer expires, the processor is configured to release the conflicting secondary cell by using the first user identity, where the first timer is configured based on the second message, and configuration information of the second timer is predefined.

In a possible implementation, the second message includes first time information, and the first time information is for indicating time information used by the terminal device to deactivate the conflicting secondary cell by using the first user identity.

In a possible implementation, the transceiver is further configured to send a third message to the first access network device by using the first user identity, where the third message is for indicating that the terminal device is in an RRC connected state by using the second user identity, the transceiver is further configured to receive third configuration information from the first access network device by using the first user identity, where the third configuration information is for updating the secondary cell in which the terminal device communicates with the first access network device by using the first user identity, and the transceiver is further configured to send the third configuration information to the second access network device by using the second user identity, and receive fourth configuration information from the second access network device, where the fourth configuration information includes information about a secondary cell in which the terminal device communicates with the second access network device by using the second user identity.

In a possible implementation, the third message includes frequency band information and power information that are required by the second access network device, the transceiver is further configured to before sending the third message to the first access network device by using the first user identity, send fifth configuration information to the second access network device by using the second user identity, where the fifth configuration information includes information about a serving cell in which the terminal device communicates with the first access network device by using the first user identity, and the transceiver is further configured to receive a fourth message from the second access network device by using the second user identity, where the fourth message includes the frequency band information and/or the power information that are/is required by the second access network device.

In a possible implementation, the transceiver is further configured to send fourth indication information to the first access network device by using the first user identity, where the fourth indication information is for indicating that the terminal device is in an RRC idle state by using the second user identity.

In a possible implementation, the processor is further configured to when the terminal device enters an RRC inactive state by using the second user identity, store, by using the second user identity, the information about the serving cell in which the terminal device communicates with the first access network device by using the first user identity.

In a possible implementation, the transceiver is further configured to receive sixth configuration information from the second access network device by using the second user identity, where the sixth configuration information is for configuring a seventh cell as a secondary cell in which the terminal device communicates with the second access network device by using the second user identity, and the transceiver is further configured to send a fifth message to the second access network device, where the fifth message is for indicating that the seventh cell is not validated.

When the communication apparatus is configured to perform the method according to any one of the second aspect or the possible implementations of the second aspect, the communication apparatus may be, for example, the first access network device described above, and the first access network device may include, for example, a transceiver and a processor. The transceiver is configured to receive first information from a terminal device, where the first information includes first indication information, a frequency band combination list supported by the terminal device, a radio resource control RRC status of the terminal device in a second cell, and frequency band information of the second cell, the terminal device supports a first user identity and a second user identity, the second cell is a cell on which the terminal device camps by using the second user identity, and the first indication information is for indicating that the first user identity and the second user identity that are supported by the terminal device share capabilities of the terminal device. The processor is adapted to configure a first secondary cell for the terminal device based on the first information, where the first secondary cell is a secondary cell in which the terminal device communicates with the first access network device by using the first user identity. The transceiver is further configured to send first configuration information to the terminal device, where the first configuration information includes information about the first secondary cell.

In a possible implementation, the first secondary cell includes a third cell and/or a fourth cell, where a frequency band corresponding to a first cell, a frequency band corresponding to the second cell, and a frequency band corresponding to the third cell are included in a first frequency band combination in the frequency band combination list, and a frequency band corresponding to the fourth cell is the same as the frequency band corresponding to the second cell, or the first secondary cell includes a fifth cell, where a frequency band corresponding to the fifth cell and a frequency band corresponding to a first cell are included in a second frequency band combination in the frequency band combination list, and the second frequency band combination does not include a frequency band corresponding to the second cell.

In a possible implementation, the first information further includes paging moment information used by a second access network device to send a paging message to the terminal device, and the second access network device is an access network device to which the second cell belongs.

In a possible implementation, the processor is further configured to stop, at a first paging moment, performing downlink scheduling for the terminal device in a conflicting secondary cell, where the first paging moment is a paging moment indicated by the paging moment information, and the conflicting secondary cell is one or more cells, in the first secondary cell, that conflict with the second cell. Alternatively, the transceiver is further configured to send second indication information to the terminal device, where the second indication information is for indicating the terminal device to stop monitoring a physical downlink control channel at a first paging moment by using the first user identity. Alternatively, the transceiver is further configured to send monitoring configuration information to the terminal device, where the monitoring configuration information is for indicating a time domain resource and/or a frequency domain resource on which the terminal device monitors the paging message, and the monitoring configuration information is determined based on the paging moment information.

In a possible implementation, the transceiver is further configured to receive frequency band information of a sixth cell from the terminal device, where the sixth cell is a cell on which the terminal device camps after performing cell reselection by using the second user identity, the processor is further adapted to configure a second secondary cell for the terminal device based on the frequency band information of the sixth cell, where the second secondary cell is a secondary cell in which the terminal device communicates with the first access network device by using the first user identity, and the transceiver is further configured to send second configuration information to the terminal device, where the second configuration information includes information about the second secondary cell.

In a possible implementation, the transceiver is further configured to receive a first message from the terminal device, where the first message is for requesting to randomly access the second cell by using the second user identity, the processor is further configured to deactivate or release the conflicting secondary cell, where the conflicting secondary cell is the one or more cells, in the first secondary cell, that conflict with the second cell, and the transceiver is further configured to send a second message to the terminal device, where the second message is for indicating the terminal device to deactivate or release the conflicting secondary cell by using the first user identity.

In a possible implementation, the first message includes third indication information, and the third indication information is for indicating a reason for initiating random access and/or duration in which the terminal device communicates with the second access network device by using the second user identity, and the processor is further configured to before deactivating or releasing the conflicting secondary cell, determine, based on the third indication information, to deactivate or release the conflicting secondary cell.

In a possible implementation, that the processor is further configured to release the conflicting secondary cell includes when a first timer or a second timer expires, the processor is configured to release the conflicting secondary cell, where the first timer is configured based on the second message, and configuration information of the second timer is predefined.

In a possible implementation, the second message includes first time information, and the first time information is for indicating time information used by the terminal device to deactivate the conflicting secondary cell by using the first user identity.

In a possible implementation, the transceiver is further configured to receive a third message from the terminal device, where the third message is for indicating that the terminal device is in an RRC connected state by using the second user identity, and the processor is further configured to determine third configuration information based on the third message, and send the third configuration information to the terminal device, where the third configuration information is for updating the secondary cell in which the terminal device communicates with the first access network device by using the first user identity.

In a possible implementation, the transceiver is further configured to receive fourth indication information from the terminal device, where the fourth indication information is for indicating that the terminal device is in an RRC idle state by using the second user identity.

In a possible implementation, the processor is further configured to determine that the terminal device enters an RRC inactive state by using the second user identity, and store information about a serving cell in which the terminal device communicates with the first access network device by using the first user identity.

According to a sixth aspect, a computer-readable storage medium is provided. The computer-readable storage medium stores instructions. When the instructions are run on a computer, the computer is enabled to perform the method according to any one of the first aspect or the possible implementations of the first aspect, or perform the method according to any one of the second aspect or the possible implementations of the second aspect.

According to a seventh aspect, a computer program product including instructions is provided. When the computer program product runs on a computer, the computer is enabled to perform the method according to any one of the first aspect or the possible implementations of the first aspect, or perform the method according to any one of the second aspect or the possible implementations of the second aspect.

According to an eighth aspect, a communication apparatus (where for example, the communication apparatus may be a chip or a chip system) is provided. The communication apparatus includes a processor and a communication interface. The processor communicates with an external device through the communication interface. The processor is configured to run a computer program, so that the communication apparatus is enabled to perform the method according to any one of the first aspect or the possible implementations of the first aspect, or perform the method according to any one of the second aspect or the possible implementations of the second aspect. It may be understood that the external device may be an object other than the processor, or an object other than the communication apparatus.

In a possible implementation, the communication apparatus further includes a memory. The memory is configured to store program instructions and data that are necessary. When the communication apparatus is the chip system, the communication apparatus may include a chip, or may include a chip and another discrete component.

According to a ninth aspect, a chip is provided. The chip includes a processor and an interface. The processor is coupled to a memory through the interface. When the processor executes a computer program or instructions in the memory, the method according to any one of the first aspect or the possible implementations of the first aspect or the method according to any one of the second aspect or the possible implementations of the second aspect is performed.

According to a tenth aspect, a communication system is provided. The communication system includes the communication apparatus according to any one of the third aspect or the possible implementations of the third aspect, and the communication apparatus according to any one of the fourth aspect or the possible implementations of the fourth aspect.

For technical effects brought by any implementation of the fifth aspect to the tenth aspect, refer to the technical effects brought by different implementations of the first aspect or the second aspect. Details are not described herein again.

DETAILED DESCRIPTION OF ILLUSTRATIVE EMBODIMENTS

Figure 1A:
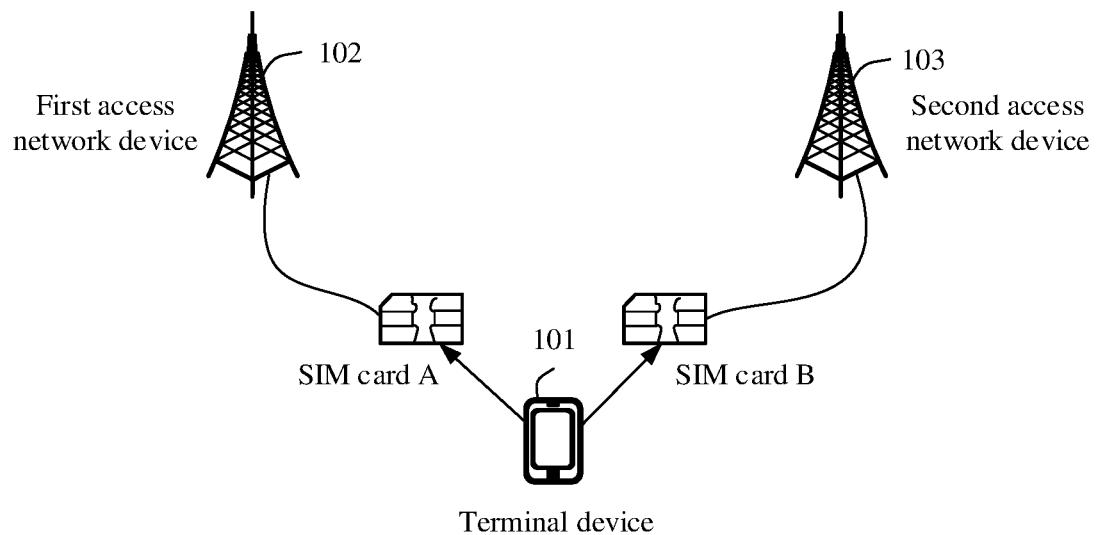
FIG. 1(a) is a first schematic diagram of an application scenario according to an embodiment of this application.

The following describes technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically the same functions or purposes. A person skilled in the art may understand that the terms such as "first" and "second" do not limit a quantity and an execution sequence, and the terms such as "first" and "second" do not indicate a definite difference either. In addition, in embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term such as "example" or "for example" is intended to present a relative concept in a specific manner for ease of understanding.

To make descriptions of the following embodiments clear and concise, related concepts or technologies are first briefly described.

A terminal device includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile, a remote station, an access point (AP), a remote terminal (remote terminal), an access terminal, a user terminal, a user agent, a user device, or the like. For example, the terminal device may include a mobile phone (which is also referred to as a "cellular" phone), a computer having a mobile terminal device, a portable, pocket-sized, handheld, computer built-in, or vehicle-mounted apparatus, a smart wearable device, and the like. For example, the terminal device is a device such as a personal communication service (PCS) phone, a cordless phone, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner. A specific technology and a specific device form that are used by the terminal device are not limited in embodiments of this application. For ease and brevity of description, an example in which the terminal device is UE is used in the following descriptions.

An access network device is a device that enables a terminal device to access a wireless network. The access network device corresponds to different devices in different systems. For example, a RAN device may include a base station and a base station controller in a 2nd generation 2G) communication system, a base station and a radio network controller RNC) in a 3rd generation (3G) communication system, an evolved base station (NodeB, eNB, or e-NodeB, evolved NodeB) in a long term evolution (LTE) system or a long term evolution-advanced (LTE-A) system, a next generation NodeB (gNB) in a 5th generation (5th generation, 5G) mobile communication technology new radio (NR) system, or a centralized unit (CU) and a distributed unit (DU) in a cloud access network (Cloud RAN) system. The access network device may correspond to a new network-side device in a future evolved or emerging system. This is not limited in embodiments of this application. For brevity of description, the following uses an example in which the access network device is a base station for description.

A SIM card, also referred to as a subscriber identification card or a smart card, is a card that includes a large-scale integrated circuit. The card stores content such as user information and an encryption key, and can be used by a network to perform authentication on a user identity and encrypt voice information of a user during a call. For example, SIM cards may include a physical SIM card and a virtual SIM card. The physical SIM card is also referred to as a conventional SIM card or a removable SIM card, and is installed in a terminal device as an independent removable component. For example, the physical SIM card may be inserted into a SIM card slot preconfigured in the terminal device. Further, based on different card sizes, physical SIM cards may be classified into a standard SIM card (also referred to as a mini SIM card), a small SIM card (also referred to as a micro-SIM card), and a micro-SIM card (also referred to as a nano-SIM card). Different from the physical SIM card, the virtual SIM card does not need to be supported by a dedicated SIM card slot. For example, a related chip that implements a SIM card function may be directly integrated into a terminal device, to implement the virtual SIM card. For example, an eSIM card (also referred to as an embedded SIM card) belongs to this type of virtual SIM card. Alternatively, an internal module of a terminal device may "virtualize" a SIM card function, to implement the virtual SIM card, for example, an iSIM card (also referred to as an integrated SIM card).

In embodiments of this application, that a SIM card is installed (or integrated) in a terminal device is considered as that the terminal device supports a user identity. In other words, there is a one-to-one correspondence between a SIM card and a user identity. For example, a terminal device in which two SIM cards (for example, a SIM card A and a SIM card B) are installed is considered as that the terminal device supports two user identities (for example, a first user identity and a second user identity). There is a one-to-one correspondence between the two SIM cards and the two user identities. For example, the SIM card A may correspond to the first user identity, and the SIM card B may correspond to the second user identity. The two SIM cards of the terminal device may be two physical SIM cards or two virtual SIM cards. Alternatively, one of the two SIM cards is a physical SIM card, and the other is a virtual SIM card. This is not specifically limited in embodiments of this application. In addition, the two SIM cards may belong to a same operator or different operators. This is not specifically limited in embodiments of this application.

In addition, in embodiments of this application, that the terminal device supports one user identity may also be described as that the terminal device has one user identity. Similarly, that the terminal device supports two user identities may also be described as that the terminal device has two user identities. In addition, it should be noted that the "first user identity supported by the terminal device" described in embodiments of this application may be understood as the "first user identity of the terminal device". The two description manners are used to indicate same content. In other words, the two description manners may be interchanged. Similarly, the "second user identity supported by the terminal device" may be understood as the "second user identity of the terminal device". The two description manners are used to indicate same content. In other words, the two description manners may be interchanged.

It should be further noted that, in embodiments of this application, an example in which the terminal device sup-ports two user identities is mainly used for description, and the two user identities are respectively referred to as a first user identity and a second user identity. The first user identity may be understood as a user identity used by the terminal device after a SIM card A is installed, and the second user identity may be understood as a user identity used by the terminal device after a SIM card B is installed. When a user identity of the terminal device is the first user identity, from a perspective of a network side, the terminal device may be understood as a user (for example, referred to as a first user, where from a perspective of a protocol, the terminal device is a terminal device). When a user identity of the terminal device is the second user identity, from the perspective of the network side, the terminal device may be understood as another user (for example, referred to as a second user). The terminal device may be registered with a first network by using the first user identity, and registered with a second network by using the second user identity. In other possible embodiments, if more than two SIM cards are installed in the terminal device, the terminal device supports more than two user identities. For example, the terminal device supports three user identities, four user identities, or more user identities, and may be registered with more than two networks, where each user identity may be registered with one network. When the terminal device supports more than two user identities, for a specific implementation, refer to related descriptions of the implementation in which the terminal device supports two user identities. Details are not described in embodiments of this application.

RRC statuses of a terminal device may include the following three states: an RRC connected state, an RRC idle state, and an RRC inactive state. (1) When the terminal device is in the RRC connected state, it indicates that an RRC connection is established between the terminal device and an access network device, and the terminal device may perform data transmission with a network side. (2) When the terminal device is in the RRC idle state, it indicates that no RRC connection is established between the terminal device and the access network device, and the access network device does not store a context of the terminal device. In this case, if the terminal device needs to enter the RRC connected state from the RRC idle state, the terminal device needs to initiate an RRC connection establishment process. (3) When the terminal device is in the RRC inactive state (also referred to as a deactivated state, an inactivated state, or a third state), it indicates that an RRC connection is previously established between the terminal device and the access network device, but the access network device subsequently releases the RRC connection to the terminal device. However, the access network device stores a context of the terminal device. In this case, if the terminal device needs to enter the RRC connected state from the RRC inactive state, the terminal device needs to initiate an RRC connection resume process.

It should be noted that when the terminal device is in the RRC idle state or the RRC inactive state, the terminal device needs to monitor, at a specific position in a specific periodicity, a paging message indicating whether the network side pages the terminal device. When detecting a paging message for paging the terminal device, the terminal device needs to enter the RRC connected state.

In addition, the terminal device in the RRC idle state or the RRC inactive state camps on a cell. As a user moves, the terminal device may need to switch to another cell with a higher priority or a better signal for camping. The new cell becomes a serving cell (or a camped cell) of the terminal device. This is a cell reselection process.

In addition, it should be further noted that, for a terminal device in which two or more SIM cards are installed, the terminal device is in a specific RRC status by using each user identity supported by the terminal device. For example, an example in which the terminal device supports two user identities is used for description. The two user identities may be referred to as a first user identity and a second user identity. The terminal device may be in a first RRC state (for example, the RRC connected state) by using the first user identity, and the terminal device may be in a second RRC state (for example, the RRC idle state) by using the second user identity. The first RRC state and the second RRC state may alternatively be the same, for example, are both the RRC connected state.

For ease of understanding, the following briefly describes application scenarios of embodiments of this application.

For example, FIG. 1(a) is a schematic diagram of a possible application scenario to which an embodiment of this application is applicable. In this application scenario, two SIM cards are installed in a terminal device 101, where the two SIM cards are a SIM card A and a SIM card B. The terminal device 101 may communicate with a first access network device 102 by using the SIM card A, and communicate with a second access network device 103 by using the SIM card B. Further, when the terminal device 101 is in an RRC connected state by using a first user identity corresponding to the SIM card A, the first access network device 102 may configure a plurality of serving cells (including one primary cell and one or more secondary cells) for the terminal device 101, and the terminal device 101 may communicate with the first access network device 102 by using the first user identity in all of the plurality of serving cells. The foregoing application scenario is also referred to as a carrier aggregation (CA) application scenario.

Figure 1B:
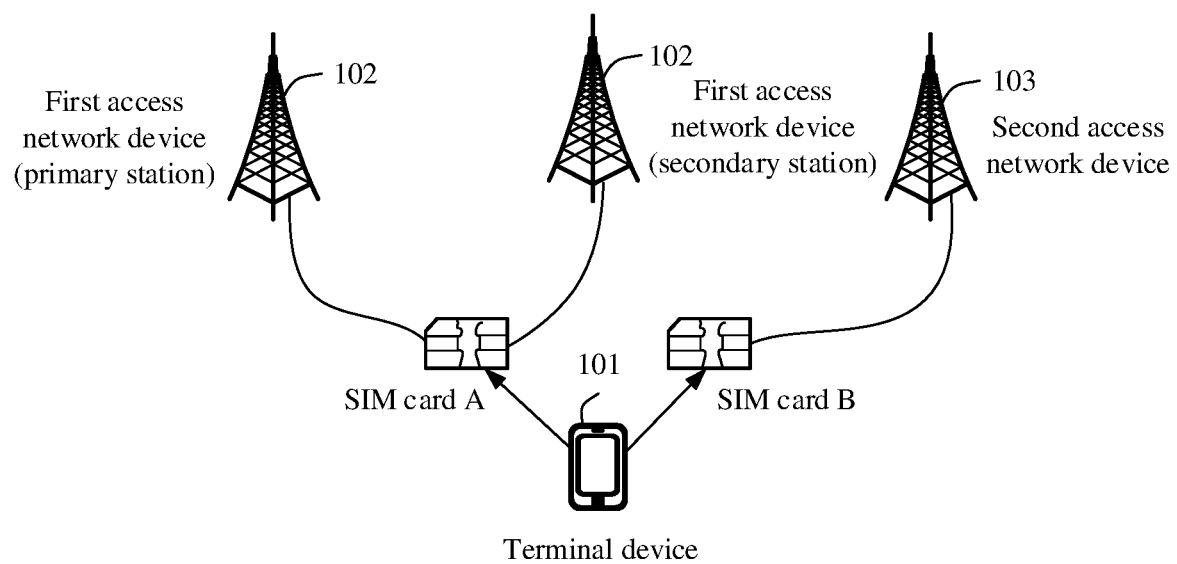
FIG. 1(b) is a second schematic diagram of an application scenario according to an embodiment of this application.

For example, FIG. 1(b) is a schematic diagram of another possible application scenario to which an embodiment of this application is applicable. A difference between this application scenario and the application scenario shown in FIG. 1(a) lies in that this application scenario includes two first access network devices 102, where one of the two first access network devices is referred to as a primary station, and the other is referred to as a secondary station. Both the primary station and the secondary station may configure serving cells for a terminal device 101. A serving cell configured by the primary station for the terminal device 101 is referred to as a master cell group (MCG), and a serving cell configured by the secondary station for the terminal device 101 is referred to as a secondary cell group (SCG). Further, the MCG may include one primary cell, or include one primary cell and a plurality of secondary cells. Similarly, the SCG may also include one primary cell (referred to as a primary secondary cell), or include one primary secondary cell and a plurality of secondary cells. The foregoing application scenario is also referred to as a dual connectivity (DC) application scenario.

For clarity and brevity of description, the following mainly uses the carrier aggregation application scenario shown in FIG. 1(a) as an example to describe a communication method, a device, and a system provided in embodiments of this application. For a specific implementation of the dual connectivity application scenario, refer to related descriptions of the carrier aggregation application scenario. Details are not described in embodiments of this application.

Figure 2:
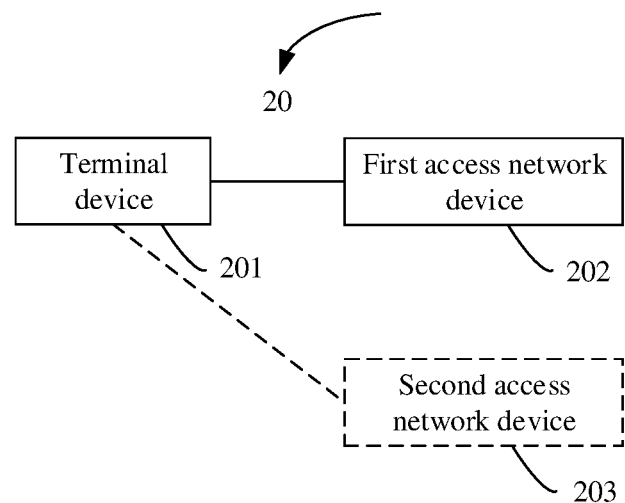
FIG. 2 is a schematic diagram of a structure of a communication system according to an embodiment of this application.

For example, FIG. 2 shows a communication system 20 according to an embodiment of this application. The communication system 20 includes a terminal device 201 that supports a first user identity and a second user identity, and a first access network device 202 that provides a service for the terminal device 201. The terminal device 201 communicates with the first access network device 202 by using the first user identity, and the terminal device 201 camps on a second cell by using the second user identity. In this embodiment of this application, the first access network device 202 is an access network device to which a first cell belongs, and the first cell is a primary cell in which the terminal device 201 communicates with the first access network device 202 by using the first user identity. Alternatively, it may be understood as that the first cell is a primary cell of a SIM card A corresponding to the first user identity. In other words, the first access network device 202 is a serving base station of the first cell. In addition, the terminal device 201 and the first access network device 202 may directly communicate with each other, or may communicate with each other through forwarding by another device. This is not specifically limited in this embodiment of this application.

The terminal device 201 is configured to send first information to the first access network device 202 by using the first user identity, where the first information includes first indication information, a frequency band combination list supported by the terminal device 201, an RRC status of the terminal device 201 in the second cell, and frequency band information of the second cell, and the first indication information is for indicating that the first user identity and the second user identity that are supported by the terminal device 201 share capabilities of the terminal device 201. The access network device 202 is configured to receive the first information from the terminal device 201, and configure a first secondary cell for the terminal device 201 based on the first information, where the first secondary cell is a secondary cell in which the terminal device 201 communicates with the first access network device 202 by using the first user identity. The first access network device 202 is further configured to send, to the terminal device 201, first configuration information including information about the first secondary cell. The terminal device 201 is further configured to receive the first configuration information from the first access network device 202 by using the first user identity. A specific implementation of the foregoing solution is described in detail in a subsequent method embodiment. Details are not described herein.

In this embodiment of this application, the terminal device 201 sends, to the first access network device 202 by using the first user identity, the first information including the first indication information, the frequency band combination list supported by the terminal device 201, the RRC status of the terminal device 201 in the second cell, and the frequency band information of the second cell, the first access network device 202 may receive the first information, may learn, based on the first indication information in the first information, that the two user identities supported by the terminal device 201 can share the capabilities of the terminal device 201, may learn of the capabilities of the terminal device 201 based on the frequency band combination list in the first information, and may learn of, based on the RRC status of the terminal device 201 in the second cell and the frequency band information of the second cell that are in the first information, a capability of the terminal device 201 that is occupied by the second user identity. Therefore, the first access network device 202 may configure, for the terminal device 201 based on the first information, the secondary cell for communicating with the first access network device 202 by using the first user identity, so that the terminal device 201 can occupy, by using the first user identity, a capability of the terminal device 201 that is not occupied by the second user identity. In this way, the capabilities of the terminal device are shared between the two user identities, and the capabilities of the terminal device are fully utilized. In other words, in this embodiment of this application, two SIM cards of the terminal device can use the capabilities of the terminal device in a sharing manner, and this avoids a limitation, in a current technology, of a rigid capability division manner on a capability of the terminal device that can be used by each SIM card, and can improve a data transmission speed of the terminal device.

Optionally, as shown in FIG. 2, the communication system 20 provided in this embodiment of this application may further include a second access network device 203. The second access network device 203 is an access network device to which the second cell belongs. In other words, the second access network device 203 is a serving base station of the second cell. The terminal device 201 and the second access network device 203 may directly communicate with each other, or may communicate with each other through forwarding by another device. This is not specifically limited in this embodiment of this application.

The terminal device 201 is further configured to send a third message to the first access network device 202 by using the first user identity, where the third message is for indicating that the terminal device 201 is in an RRC connected state by using the second user identity. The first access network device 202 is further configured to receive the third message from the terminal device 201, and send third configuration information to the terminal device 201, where the third configuration information is for updating the secondary cell in which the terminal device 201 communicates with the first access network device 202 by using the first user identity. The terminal device 201 is further configured to receive the third configuration information from the first access network device 202 by using the first user identity, and send the third configuration information to the second access network device 203 by using the second user identity. The second access network device 203 is configured to receive the third configuration information from the terminal device 201, and send fourth configuration information to the terminal device 201 based on the third configuration information, where the fourth configuration information includes information about a secondary cell in which the terminal device 201 communicates with the second access network device 203 by using the second user identity. The terminal device 201 is further configured to receive the fourth configuration information from the second access network device 203.

During implementation of this application, because the second access network device 203 and the first access network device 202 may negotiate used capabilities of the terminal device 201, the second access network device 203 and the first access network device 202 share the capabilities of the terminal device 201. In this way, a conflict between the capabilities of the terminal device 201 that are used by the second access network device 203 and the first access network device 202 is avoided.

Optionally, the communication system 20 shown in FIG. 2 may be applied to various communication systems, for example, a global system for mobile communications (GSM), a code division multiple access (CDMA) system, a wideband code division multiple access (WCDMA) system, a general packet radio service (GPRS) system, a 4th generation (4G) network, an LTE system, an LTE frequency division duplex (FDD) system, an LTE time division duplex (TDD) system, a universal mobile telecommunication system (UMTS), a worldwide interoperability for microwave access (WiMAX) communication system, a 5G system, an NR system, and a future evolved communication system such as a 6th generation (6G) communication system. This is not specifically limited in this embodiment of this application.

Figure 3:
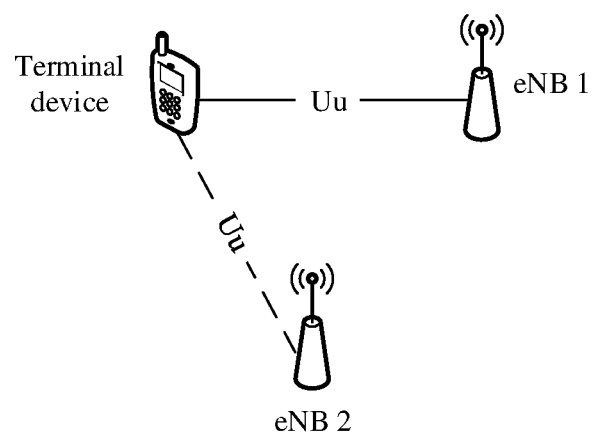
FIG. 3 is a schematic diagram of an architecture of an existing 4G network.

For example, it is assumed that the communication system 20 shown in FIG. 2 is applied to a current 4G network. In this case, as shown in FIG. 3, a network element or an entity corresponding to the terminal device 201 may be a terminal device in the 4G network, a network element or an entity corresponding to the first access network device 202 may be an eNB 1 in the 4G network, and a network element or an entity corresponding to the second access network device 203 may be an eNB 2 in the 4G network. The terminal device communicates with the eNB 1 or the eNB 2 through a Uu interface.

Figure 4:
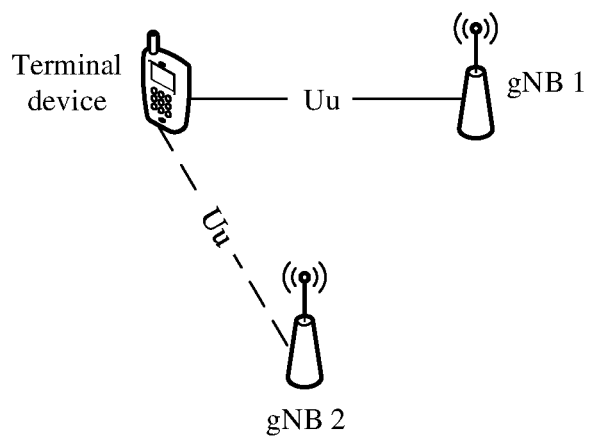
FIG. 4 is a schematic diagram of an architecture of an existing standalone 5G network.

Alternatively, for example, it is assumed that the communication system 20 shown in FIG. 2 is applied to a current standalone (standalone, SA) 5G network. In this case, as shown in FIG. 4, a network element or an entity corresponding to the terminal device 201 may be a terminal device in the 5G network, a network element or an entity corresponding to the first access network device 202 may be a gNB 1 in the 5G network, and a network element or an entity corresponding to the second access network device 203 may be a gNB 2 in the 5G network. The terminal device communicates with the gNB 1 or the gNB 2 through a Uu interface.

Figure 5:
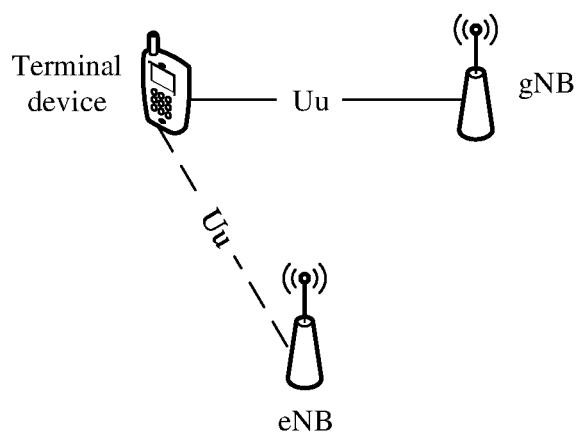
FIG. 5 is a schematic diagram of an architecture of an existing non-standalone 5G network.

Alternatively, for example, it is assumed that the communication system 20 shown in FIG. 2 is applied to a current non-standalone (NSA) 5G network. In this case, as shown in FIG. 5, a network element or an entity corresponding to the terminal device 201 may be a terminal device in the 5G network, a network element or an entity corresponding to the first access network device 202 may be a gNB in the 5G network, and a network element or an entity corresponding to the second access network device 202 may be an eNB in the 5G network. Alternatively, a network element or an entity corresponding to the first access network device 202 may be an eNB in the 5G network, and a network element or an entity corresponding to the second access network device 202 may be a gNB in the 5G network. The terminal device communicates with the gNB or the eNB through a Uu interface.

Optionally, a related function of the terminal device 201 or the first access network device 202 in this embodiment of this application may be implemented by one device, may be jointly implemented by a plurality of devices, or may be implemented by one or more function modules in one device. This is not specifically limited in this embodiment of this application. It may be understood that the foregoing function may be a network element in a hardware device, a software function running on dedicated hardware, a combination of hardware and software, or a virtualization function instantiated on a platform (for example, a cloud platform).

Figure 6:
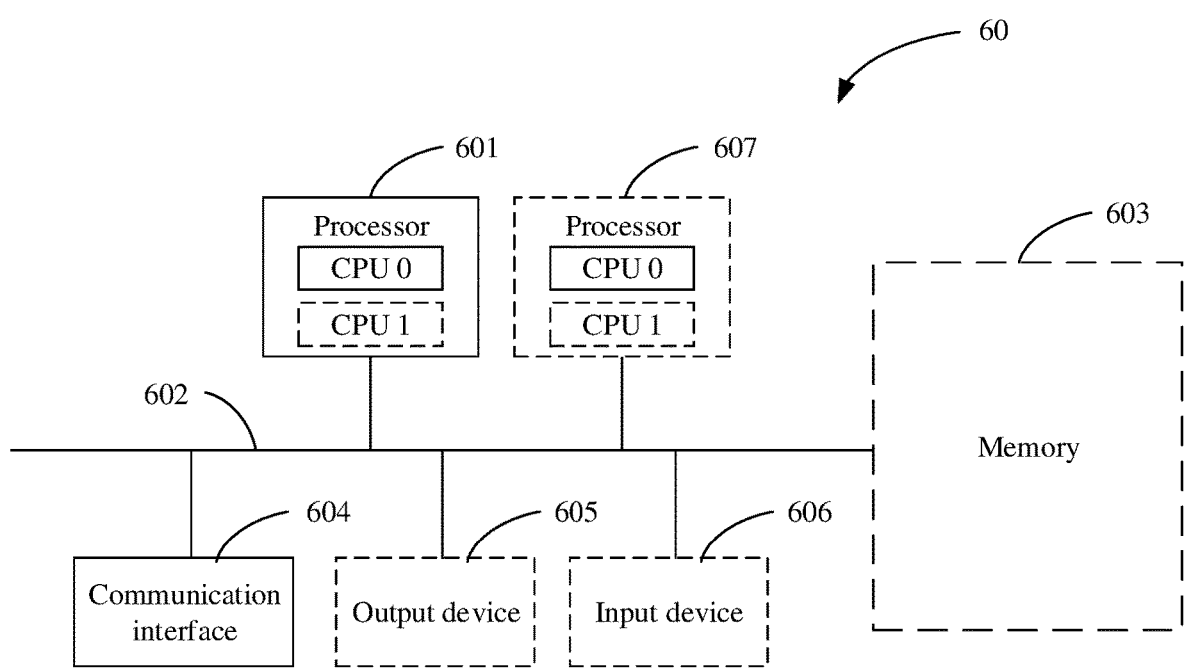
FIG. 6 is a schematic diagram of a structure of a communication apparatus according to an embodiment of this application.

For example, the related function of the terminal device 201 or the first access network device 202 in this embodiment of this application may be implemented by a communication apparatus 60 in FIG. 6. FIG. 6 is a schematic diagram of a structure of the communication apparatus 60 according to an embodiment of this application. The communication apparatus 60 includes one or more processors 601, a communication line 602, and at least one communication interface (where in FIG. 6, an example in which a communication interface 604 and one processor 601 are included is merely used for description), and optionally, may further include a memory 603.

The processor 601 may be a general-purpose central processing unit (CPU), a microprocessor, an application-specific integrated circuit (ASIC), or one or more integrated circuits configured to control program execution of the solutions in this application.

The communication line 602 may include a path for connecting different components.

The communication interface 604 may be a transceiver module, configured to communicate with another device or a communication network, for example, the Ethernet, a RAN, or a wireless local area network (WLAN). For example, the transceiver module may be an apparatus such as a transceiver or a transceiver machine. Optionally, the communication interface 604 may alternatively be a transceiver circuit located in the processor 601, and is configured to implement signal input and signal output of the processor.

The memory 603 may be an apparatus having a storage function. For example, the memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 603 is not limited thereto. The memory may exist independently and is connected to the processor through the communication line 602. Alternatively, the memory may be integrated with the processor.

The memory 603 is configured to store computer-executable instructions for performing the solutions of this application, and the processor 601 controls execution. The processor 601 is configured to execute the computer-executable instructions stored in the memory 603, to implement a communication method provided in embodiments of this application.

Alternatively, in this embodiment of this application, the processor 601 may implement a processing-related function in a communication method provided in the following embodiment of this application, and the communication interface 604 may be responsible for communicating with the another device or the communication network. This is not specifically limited in this embodiment of this application.

The computer-executable instructions in this embodiment of this application may also be referred to as application program code. This is not specifically limited in this embodiment of this application.

During specific implementation, in an embodiment, the processor 601 may include one or more CPUs, for example, a CPU 0 and a CPU 1 in FIG. 6.

During specific implementation, in an embodiment, the communication apparatus 60 may include a plurality of processors, for example, the processor 601 and a processor 607 in FIG. 6. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in an embodiment, the communication apparatus 60 may further include an output device 605 and an input device 606. The output device 605 communicates with the processor 601, and may display information in a plurality of manners.

The communication apparatus 60 may be a general-purpose apparatus or a dedicated apparatus. This is not specifically limited in this embodiment of this application.

The following describes in detail a communication method provided in embodiments of this application with reference to FIG. 1 to FIG. 6.

It should be noted that, in the following embodiment of this application, names of messages between network elements, names of parameters in the messages, or the like are merely examples, and there may be other names during specific implementation. This is not specifically limited in embodiments of this application.

Figure 7:
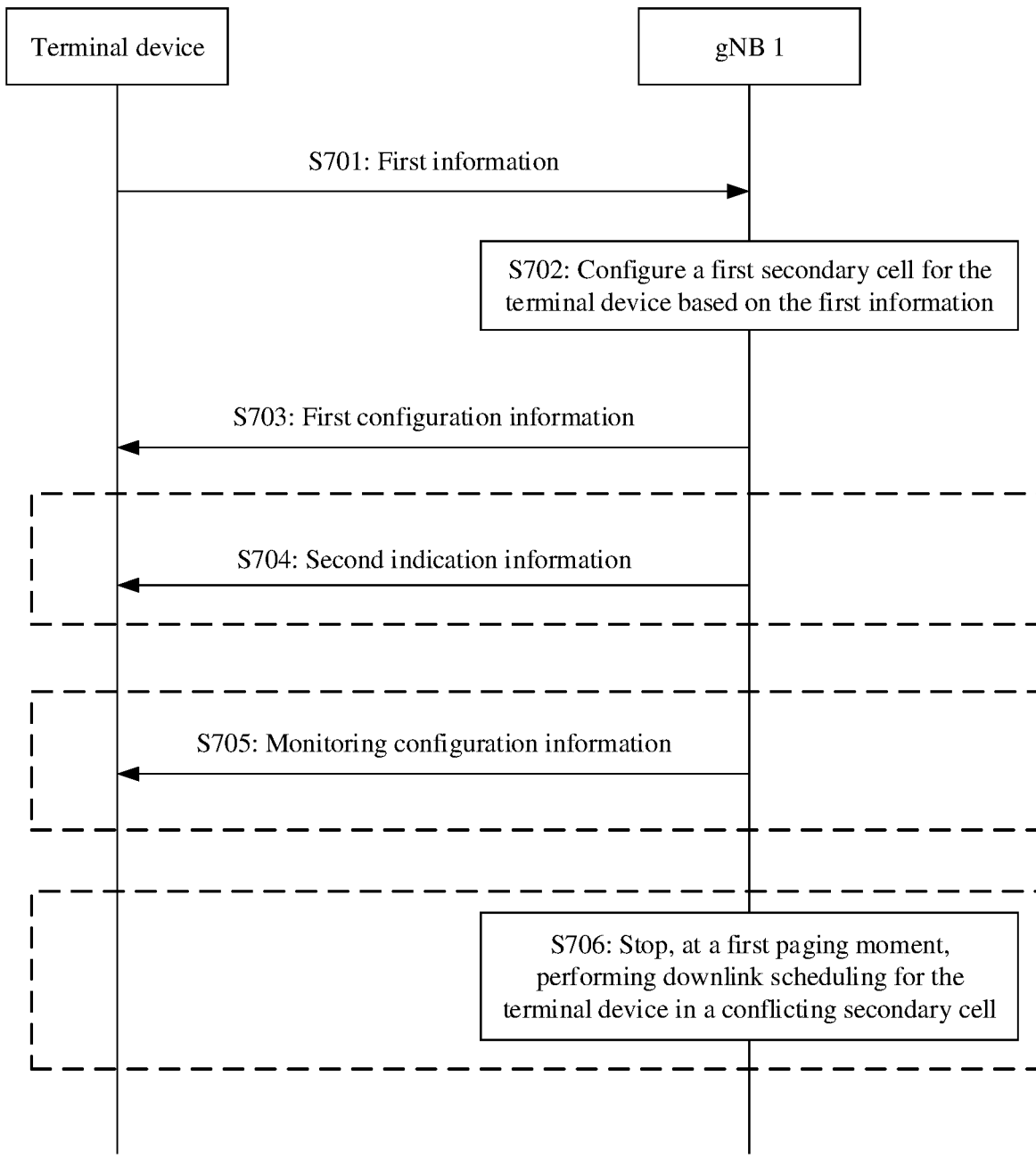
FIG. 7 is a first schematic flowchart of a communication method according to an embodiment of this application.

An example in which the communication system shown in FIG. 2 is applied to the 5G network shown in FIG. 4, the first access network device is the gNB 1, and the second access network device is the gNB 2 is used. FIG. 7 shows a communication method according to an embodiment of this application. The communication method includes the following steps S701 to S703.

S701: The terminal device sends first information to the gNB 1 by using a first user identity, and the gNB 1 receives the first information from the terminal device.

The first information includes first indication information, a frequency band combination list supported by the terminal device, an RRC status of the terminal device in a second cell, and frequency band information of the second cell, the second cell is a cell on which the terminal device camps by using a second user identity, and the first indication information is for indicating that the first user identity and the second user identity that are supported by the terminal device share capabilities of the terminal device.

It should be noted that the frequency band information of the second cell may include one or more of pieces of information such as frequency information of the second cell, a bandwidth, a subcarrier spacing, and an operating frequency range. When the second cell is an NR cell, the frequency information of the second cell includes point A frequency information of the second cell, and frequency information of a synchronization signal and physical broadcast channel block (synchronization signal and PBCH block, SSB). Unless otherwise specified, the frequency band information in this embodiment of this application is the foregoing information.

In addition, it should be noted that the frequency band combination (BC) list supported by the terminal device may also be referred to as a carrier aggregation combination list supported by the terminal device, or briefly referred to as a frequency band combination supported by the terminal device, or the like. The frequency band combination list supported by the terminal device is related to a hardware resource of the terminal device. Different terminal devices may support different frequency band combination lists. A frequency band combination in a frequency band combination list supported by each terminal device indicates a carrier aggregation combination that can be supported by a hardware resource of the terminal device. Therefore, the gNB 1 may determine, based on the frequency band combination list supported by the terminal device, whether the terminal device supports addition of a specific cell as a serving cell of the terminal device.

It may be understood that, the gNB 1 may learn, based on the first indication information, that the two user identities supported by the terminal device can share the capabilities of the terminal device, the gNB 1 may learn of the capabilities of the terminal device based on the frequency band combination list supported by the terminal device, and the gNB 1 may learn of, based on the RRC status of the terminal device in the second cell and the frequency band information of the second cell, a capability of the terminal device that is occupied by the second user identity.

It should be noted that the first information may include all of the foregoing pieces of information, or may include one or more of the foregoing pieces of information.

For example, in a possible implementation, in consideration of a case that the terminal device may already report the frequency band combination list supported by the terminal device to the gNB 1 before sending the first information, the first information may include the frequency band information of the second cell. After determining that the terminal device supports capability division performed in a sharing manner and the RRC status of the terminal device in the second cell is an RRC idle state or an RRC inactive state, the terminal device may send the first information to the gNB 1. In this way, after receiving the first information from the terminal device (indicating that the terminal device supports capability division performed in the sharing manner), the gNB 1 may configure a corresponding secondary cell for the terminal device based on the frequency band information of the second cell.

Alternatively, in another possible implementation, whether the terminal device has sent the frequency band combination list supported by the terminal device to the gNB 1 before sending the first information to the gNB 1 by using the first user identity is not considered, but the frequency band combination list supported by the terminal device and the frequency band information of the second cell are directly sent to the gNB 1 by using the first information. In other words, in addition to the frequency band information of the second cell, the first information may further include the frequency band combination list supported by the terminal device.

Alternatively, in still another possible implementation, the first information may include the first indication information and the frequency band information of the second cell. To be specific, after determining that the RRC status of the terminal device in the second cell is an RRC idle state or an RRC inactive state, the terminal device sends, to the gNB 1, the first information including the first indication information and the frequency band information of the second cell, so that the gNB 1 determines, based on the first indication information, that the terminal device supports capability division performed in a sharing manner, and configures a corresponding secondary cell for the terminal device based on the frequency band information of the second cell.

Alternatively, in yet another possible implementation, the first information may include the RRC status of the terminal device in the second cell and the frequency band information of the second cell. After determining that capability division may be performed in a sharing manner, the terminal device sends the first information to the gNB 1. After the gNB 1 receives the first information from the terminal device (indicating that the terminal device supports capability division performed in the sharing manner), and when the RRC status of the terminal device in the second cell is an RRC idle state or an RRC inactive state, the gNB 1 configures a corresponding secondary cell for the terminal device based on the frequency band information of the second cell.

S702: The gNB 1 configures a first secondary cell for the terminal device based on the first information.

The first secondary cell is a secondary cell in which the terminal device communicates with the gNB 1 by using the first user identity. Alternatively, this may be understood as that the first secondary cell is a secondary cell of a SIM card A corresponding to the first user identity.

In a possible implementation, when the frequency band combination list supported by the terminal device includes a frequency band combination (referred to as a first frequency band combination in this embodiment of this application) including another frequency band (referred to as a third frequency band in this embodiment of this application) in addition to a frequency band (referred to as a first frequency band in this embodiment of this application) corresponding to a first cell and a frequency band (referred to as a second frequency band in this embodiment of this application) corresponding to the second cell, the gNB 1 may configure a third cell operating in the third frequency band as the first secondary cell. Alternatively, the gNB 1 may configure, as the first secondary cell, a fourth cell that has a same frequency band as the second cell. Certainly, the gNB 1 may alternatively configure the third cell and the fourth cell as the first secondary cell. A frequency band corresponding to a cell refers to a frequency band to which a physical frequency occupied by the cell belongs.

In other words, the first secondary cell may include the third cell and/or the fourth cell. The frequency band corresponding to the first cell, the frequency band corresponding to the second cell, and a frequency band corresponding to the third cell are included in a first frequency band combination in the frequency band combination list, and the fourth cell and the second cell correspond to the same frequency band.

Figure 8A:
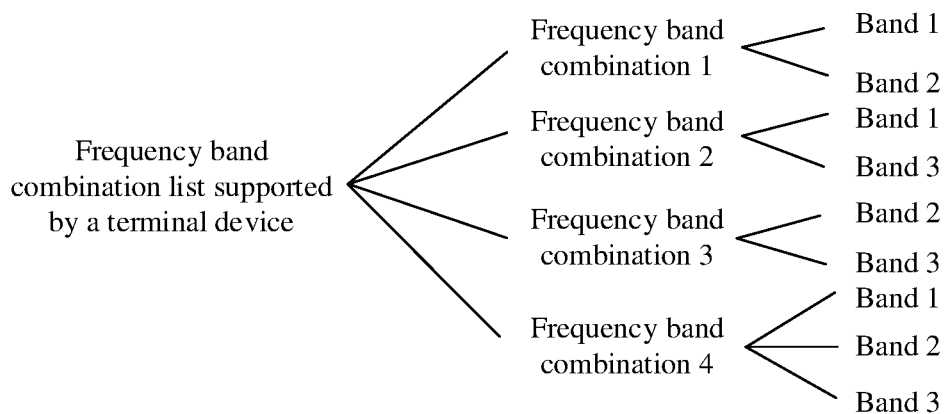
FIG. 8(a) shows an example of a frequency band combination list supported by a terminal device according to an embodiment of this application.

For example, with reference to FIG. 8(a), it is assumed that the frequency band combination list supported by the terminal device is a frequency band combination list shown in FIG. 8(a), the first frequency band corresponding to the first cell is a band 1, and the second frequency band corresponding to the second cell is a band 2. It can be learned that in addition to the band 1 and the band 2, a frequency band combination 4 in the frequency band combination list supported by the terminal device further includes a band 3. In this case, the gNB 1 may configure a cell operating in the band 3 as the first secondary cell. Alternatively, the gNB 1 may configure, as the first secondary cell, another cell that has a same frequency as the cell.

Alternatively, in another possible implementation, when the frequency band combination list supported by the terminal device includes a frequency band combination (referred to as a second frequency band combination in this embodiment of this application) including another frequency band (referred to as a fourth frequency band in this embodiment of this application) in addition to a first frequency band corresponding to a first cell but not including a second frequency band corresponding to the second cell, the gNB 1 may still configure a fifth cell operating in the fourth frequency band as the first secondary cell.

In other words, the first secondary cell may include the fifth cell. A frequency band corresponding to the fifth cell and the frequency band corresponding to the first cell are included in the second frequency band combination in the frequency band combination list, and the second frequency band combination does not include the frequency band corresponding to the second cell.

Figure 8B:
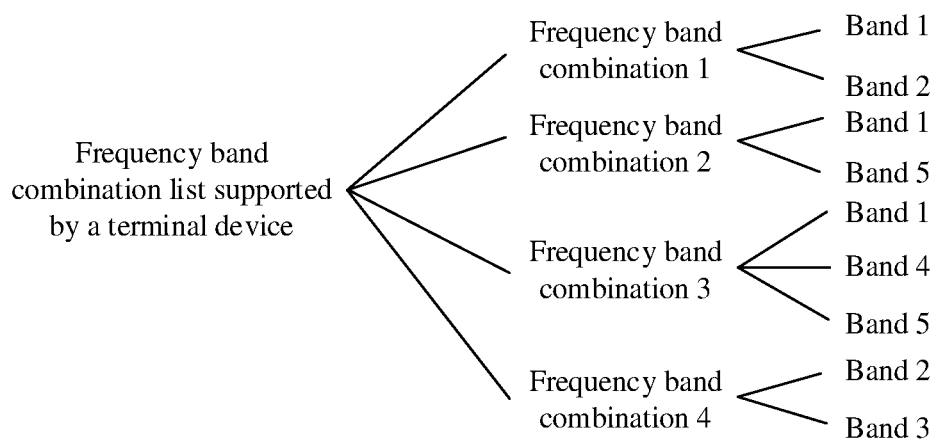
FIG. 8(b) shows another example of a frequency band combination list supported by a terminal device according to an embodiment of this application.

For example, with reference to FIG. 8(b), it is assumed that the frequency band combination list supported by the terminal device is a frequency band combination list shown in FIG. 8(b), the first frequency band corresponding to the first cell is a band 1, and the second frequency band corresponding to the second cell is a band 2. It can be learned that in addition to the band 1, a frequency band combination 3 in the frequency band combination list supported by the terminal device further includes a band 4 and a band 5, and the frequency band combination 3 does not include the band 2. In this case, the gNB 1 may configure a cell operating in the band 4 and/or the band 5 as the first secondary cell.

Optionally, in this embodiment of this application, when a communication mode between the terminal device and the gNB 1 is a frequency division duplex (FDD) mode, the gNB 1 may separately configure corresponding first secondary cells for an uplink and a downlink of the terminal device, and the first secondary cells corresponding to the uplink and the downlink may be different.

It should be noted that, in the foregoing possible implementations of this embodiment of this application, because the terminal device supports a frequency band combination including the first frequency band, the second frequency band, and the third frequency band, after the third cell is configured as the first secondary cell, communication between the terminal device using the first user identity and the gNB 1 does not affect communication between the terminal device using the second user identity and the gNB 2. For example, the terminal device may initiate random access to the gNB 2 in the second cell by using the second user identity, and may normally receive a downlink message from the gNB 2 by using the second user identity. However, because the terminal device does not support a frequency band combination including the first frequency band, the second frequency band, and the frequency band corresponding to the fourth cell or the fifth cell, after the fourth cell or the fifth cell is configured as the first secondary cell, communication between the terminal device using the first user identity and the gNB 1 may affect communication between the terminal device using the second user identity and the gNB 2. This case may be described as follows. The fourth cell or the fifth cell in the first secondary cell configured by the gNB 1 for the terminal device conflicts with the second cell, where the fourth cell or the fifth cell that conflicts with the second cell is referred to as a "conflicting secondary cell". For example, when a first secondary cell corresponding to the uplink conflicts with the second cell, the terminal device cannot initiate random access to the gNB 2 in the second cell; when a first secondary cell corresponding to the downlink conflicts with the second cell, the terminal device cannot normally receive the downlink message from the gNB 2. For this case, refer to subsequent descriptions of this embodiment of this application.

S703: The gNB 1 sends first configuration information to the terminal device, and the terminal device receives the first configuration information from the gNB 1.

The first configuration information includes information about the first secondary cell.

In this embodiment of this application, the terminal device sends, to the gNB 1 by using the first user identity, the first information including the first indication information, the frequency band combination list supported by the terminal device, the RRC status of the terminal device in the second cell, and the frequency band information of the second cell, the gNB 1 may receive the first information, may learn, based on the first indication information in the first information, that the two user identities supported by the terminal device can share the capabilities of the terminal device, may learn of the capabilities of the terminal device based on the frequency band combination list in the first information, and may learn of, based on the RRC status of the terminal device in the second cell and the frequency band information of the second cell that are in the first information, the capability of the terminal device that is occupied by the second user identity. Therefore, the gNB 1 may configure, for the terminal device based on the first information, the secondary cell for communicating with the gNB 1 by using the first user identity, so that the terminal device can occupy, by using the first user identity, a capability of the terminal device that is not occupied by the second user identity. In this way, the capabilities of the terminal device are shared between the two user identities, and the capabilities of the terminal device are fully utilized. In other words, in this embodiment of this application, two SIM cards of the terminal device can use the capabilities of the terminal device in a sharing manner, and this avoids a limitation, in a current technology, of a rigid capability division manner on a capability of the terminal device that can be used by each SIM card, and can improve a data transmission speed of the terminal device.

Optionally, to avoid a problem that a conflict between the second cell and the first secondary cell that is configured by the gNB 1 for the terminal device affects receiving of the downlink message from the gNB 2 by the terminal device, the first information in this embodiment of this application may further include paging moment information that is used by the gNB 2 to send a paging message to the terminal device. The paging moment information may indicate a paging moment (referred to as a first paging moment in this embodiment of this application) at which the gNB 2 sends the paging message to the terminal device. For example, the paging moment information may include a paging frame (PF) and a paging moment (PO).

Further, in a possible implementation, as shown in FIG. 7, the communication method provided in this embodiment of this application may further include the following step S704.

S704: The gNB 1 sends second indication information to the terminal device, and the terminal device receives the second indication information from the gNB 1 by using the first user identity, where the second indication information is for indicating the terminal device to stop monitoring a physical downlink control channel at the first paging moment by using the first user identity.

To be specific, after determining that the first secondary cell configured for the terminal device conflicts with the second cell, the gNB 1 indicates the terminal device to stop occupying the first paging moment by using the first user identity, to avoid the paging message sent by the gNB 2 to the terminal device, so that the terminal device can receive the paging message from the gNB 2 by using the second user identity.

Alternatively, in another possible implementation, as shown in FIG. 7, the communication method provided in this embodiment of this application may further include the following step S705.

S705: The gNB 1 sends monitoring configuration information to the terminal device, and the terminal device receives the monitoring configuration information from the gNB 1 by using the first user identity.

The monitoring configuration information is for indicating a time domain resource and/or a frequency domain resource on which the terminal device monitors the paging message, and the monitoring configuration information is determined based on the paging moment information. For example, the time domain resource and/or the frequency domain resource that are/is indicated by the monitoring configuration information may be a part of a time-frequency resource occupied when the terminal device monitors, by using the second user identity, the paging message that is from the gNB 2.

To be specific, based on the time-frequency resource occupied when the terminal device monitors, by using the second user identity, the paging message that is from the gNB 2, the gNB 1 may specify a part of the time-frequency resource for the terminal device to monitor the paging message that is from the gNB 2, and no longer performs downlink scheduling for the terminal device on the specified part of the resource.

Alternatively, in still another possible implementation, as shown in FIG. 7, the communication method provided in this embodiment of this application may further include the following step S706.

S706: The gNB 1 stops, at the first paging moment, performing downlink scheduling for the terminal device in a conflicting secondary cell.

The conflicting secondary cell is one or more cells, in the first secondary cell, that conflict with the second cell. For example, the fourth cell and the fifth cell in the first secondary cell configured by the gNB 1 for the terminal device in step S702 are conflicting secondary cells.

To be specific, after the gNB 1 determines that the gNB 1 configures, for the terminal device, a first secondary cell that conflicts with the second cell, when the paging moment (that is, the first paging moment) at which the gNB 2 sends the paging message to the terminal device arrives, the gNB 1 stops performing downlink scheduling for the terminal device in the conflicting first secondary cell, to avoid the paging message sent by the gNB 2 to the terminal device, so that the terminal device can receive the paging message from the gNB 2 by using the second user identity.

Figure 9:
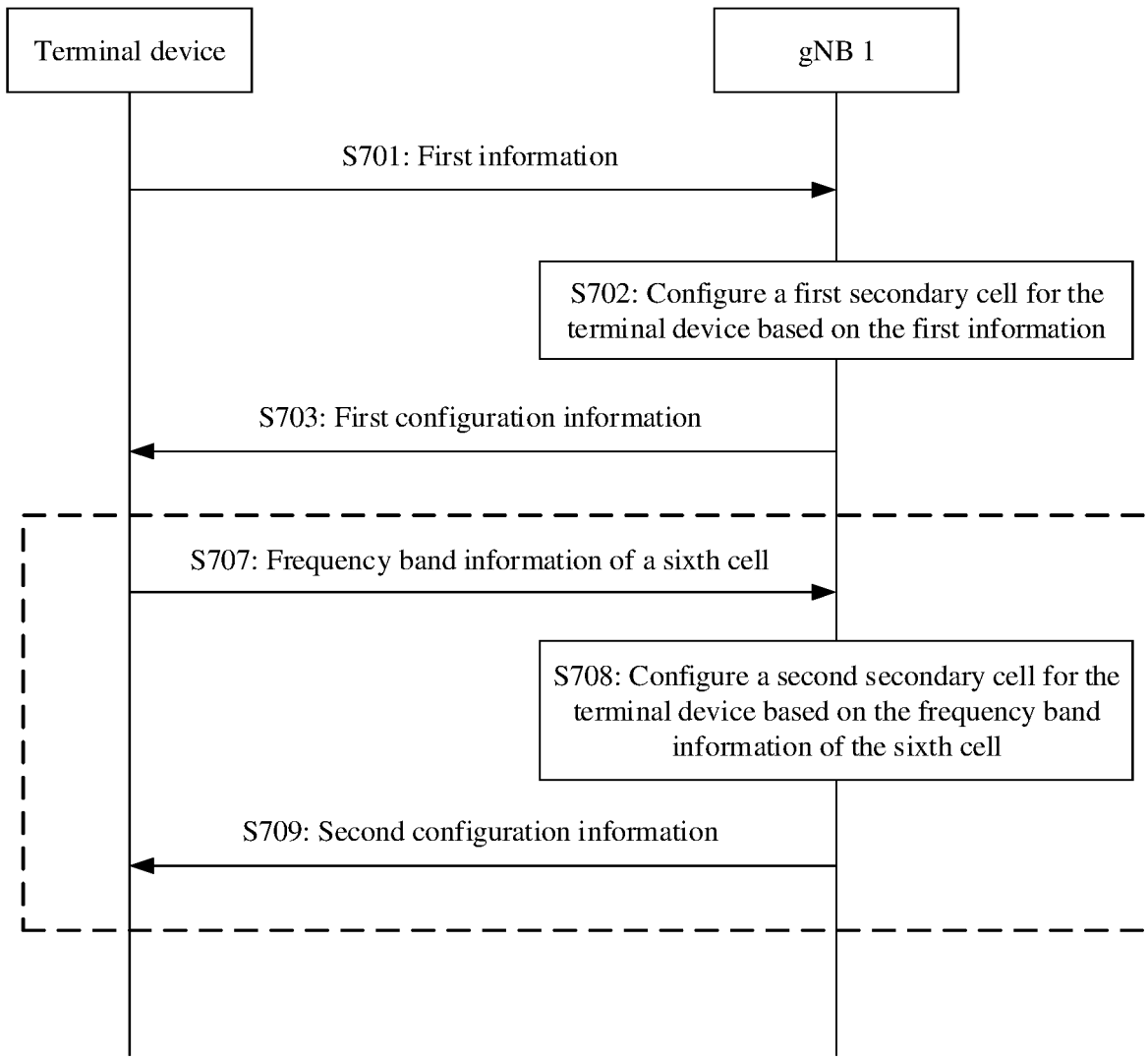
FIG. 9 is a second schematic flowchart of a communication method according to an embodiment of this application.

In an optional implementation of this embodiment of this application, as shown in FIG. 9, the communication method provided in this embodiment of this application may further include the following steps S707 to S709.

S707: The terminal device sends frequency band information of a sixth cell to the gNB 1 by using the first user identity, and the gNB 1 receives the frequency band information of the sixth cell from the terminal device.

The sixth cell is a cell on which the terminal device camps after performing cell reselection by using the second user identity.

To be specific, when the terminal device performs cell reselection by using the second user identity, the terminal device may notify the gNB 1 of information about the cell on which the terminal device camps by using the second user identity after reselection, so that the gNB 1 reconfigures, for the terminal device based on the information, a secondary cell for communicating with the gNB 1 by using the first user identity.

S708: The gNB 1 configures a second secondary cell for the terminal device based on the frequency band information of the sixth cell.

The second secondary cell is a secondary cell in which the terminal device communicates with the gNB 1 by using the first user identity.

S709: The gNB 1 sends second configuration information to the terminal device, and the terminal device receives the second configuration information from the gNB 1 by using the first user identity.

The second configuration information includes information about the second secondary cell.

In other words, when the gNB 1 updates the secondary cell in which the terminal device communicates with the gNB 1 by using the first user identity, the gNB 1 needs to notify the terminal device of information about the updated secondary cell.

Figure 10:
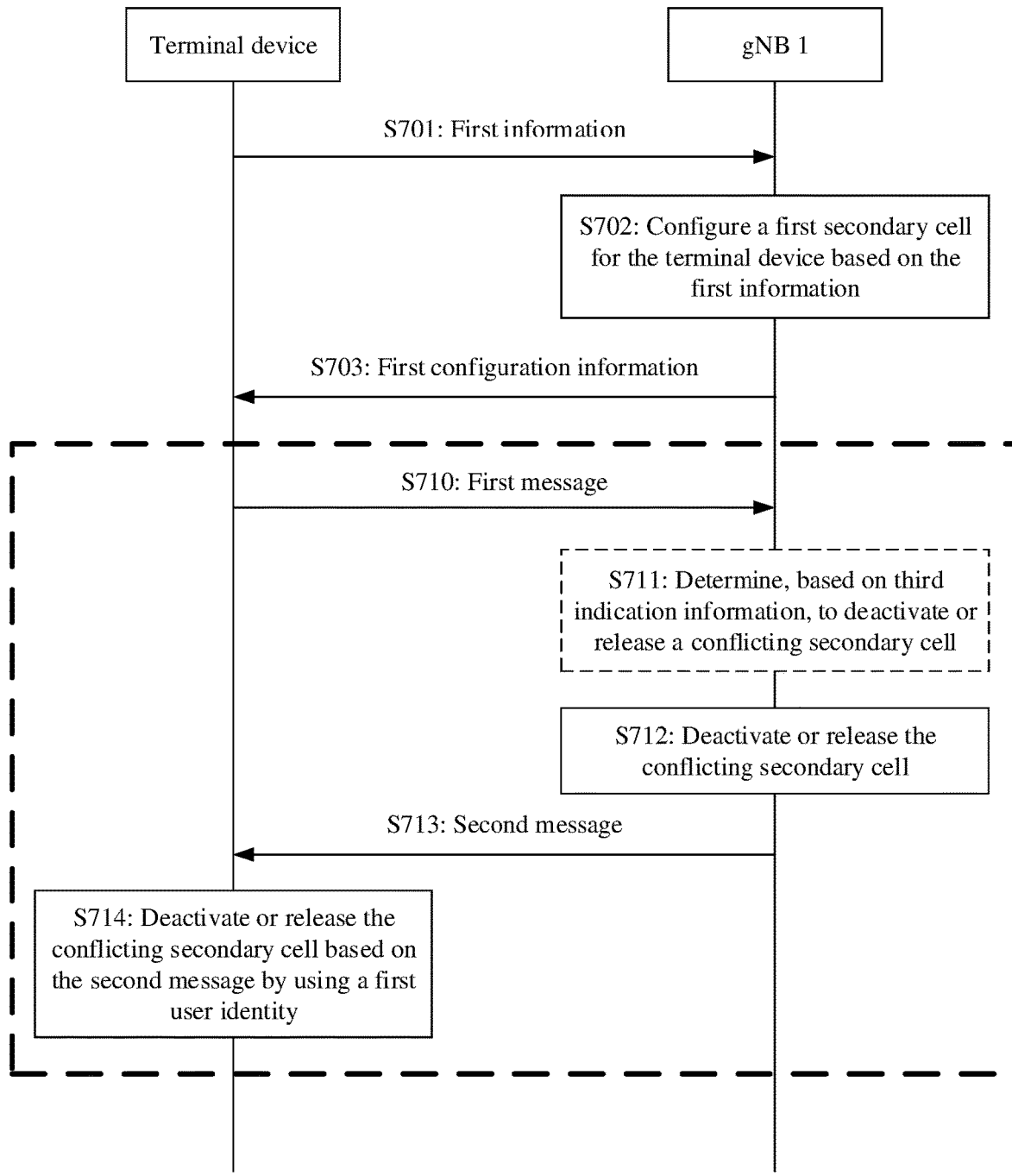
FIG. 10 is a third schematic flowchart of a communication method according to an embodiment of this application.

In an optional implementation of this embodiment of this application, to avoid a problem that the terminal device cannot initiate random access in the second cell by using the second user identity because the secondary cell configured by the gNB 1 for the terminal device conflicts with the second cell on which the terminal device camps by using the second user identity, as shown in FIG. 10, the communication method provided in this embodiment of this application may further include the following steps S710 to S714.

S710: The terminal device sends a first message to the gNB 1 by using the first user identity, and the gNB 1 receives the first message from the terminal device.

The first message is for requesting to randomly access the second cell by using the second user identity.

To be specific, when the terminal device needs to initiate random access by using the second user identity, the terminal device may first initiate, to the gNB 1, a request message for performing random access by using the second user identity.

Optionally, the first message may include third indication information, and the third indication information is for indicating a reason for initiating random access, or the third indication information is for indicating duration in which the terminal device communicates with the gNB 2 by using the second user identity, or the third indication information is for indicating the reason for initiating random access and the duration in which the terminal device communicates with the gNB 2 by using the second user identity. The duration in which the terminal device communicates with the gNB 2 by using the second user identity may be understood as duration in which the terminal device is temporarily not in the conflicting secondary cell.

For example, the reason for initiating random access may be that the paging message is received, or periodic tracking area update (TAU) or RAN-based notification area update (RNAU) needs to be performed, or uplink data arrives and the terminal device needs to enter an RRC connected state, or system information update (triggering an on-demand system information mechanism, namely, an on-demand SI mechanism) needs to be performed. When the uplink data arrives and the terminal device needs to enter the RRC connected state, the terminal device requires a continuous uplink/downlink capability, so that a continuous uplink capability needs to be allocated to the terminal device. For random access triggered by the TAU, the RNAU, or the on-demand SI mechanism triggered by the system information update, after the terminal device randomly accesses the second cell, the terminal device may subsequently enter the RRC idle state. In this case, the continuous uplink/downlink capability does not need to be allocated to the terminal device.

S711: Optionally, the gNB 1 determines, based on the third indication information, to deactivate or release the conflicting secondary cell.

For a definition of the conflicting secondary cell, refer to related descriptions in step S702. Details are not described herein again.

In a possible implementation, when the gNB 1 determines, based on the third indication information, that the terminal device requires the continuous uplink/downlink capability after randomly accessing the second cell, the gNB 1 determines to release the conflicting secondary cell, when the gNB 1 determines, based on the third indication information, that the terminal device requires an uplink/downlink capability for only a period of time after randomly accessing the second cell, the gNB 1 determines to deactivate the conflicting secondary cell. Further, after determining that the terminal device randomly accesses the second cell and completes a related operation, the gNB 1 may activate the conflicting secondary cell again.

S712: The gNB 1 deactivates or releases the conflicting secondary cell.

To be specific, when determining that a conflicting secondary cell exists in the secondary cell configured by the gNB 1 for the terminal device, the gNB 1 deactivates or releases the conflicting secondary cell, so that the terminal device can randomly access the second cell by using the second user identity.

S713: The gNB 1 sends a second message to the terminal device, and the terminal device receives the second message from the gNB 1 by using the first user identity.

The second message is for indicating the terminal device to deactivate or release the conflicting secondary cell by using the first user identity.

In other words, after deactivating or releasing the conflicting secondary cell, the gNB 1 indicates the terminal device to deactivate or release the conflicting secondary cell by using the first user identity.

Optionally, if the gNB 1 determines to deactivate the conflicting secondary cell, the second message sent by the gNB 1 to the terminal device may include first time information, and the first time information is for indicating time information used by the terminal device to deactivate the conflicting secondary cell by using the first user identity. For example, the first time information may indicate a specified period of time, for example, may indicate a specified time window. In addition, the first time information may alternatively indicate a specified time domain resource. This is not specifically limited in this embodiment of this application.

S714: The terminal device deactivates or releases the conflicting secondary cell based on the second message by using the first user identity.

In this way, after deactivating or releasing the conflicting secondary cell by using the first user identity, the terminal device may initiate random access to the gNB 2 by using the second user identity.

In a possible implementation, the gNB 1 may configure, by using the second message, a dedicated timer (referred to as a first timer in this embodiment of this application) for releasing the conflicting secondary cell. For example, the second message may include configuration information of the first timer. After receiving the second message, the terminal device may configure the first timer based on the configuration information of the first timer. When the first timer expires, the gNB 1 and the terminal device may simultaneously release the conflicting secondary cell. Alternatively, in another possible implementation, the gNB 1 and the terminal device may release the conflicting secondary cell based on a predefined timer (referred to as a second timer in this embodiment of this application).

To be specific, that the gNB 1 releases the conflicting secondary cell may include when the first timer or the second timer expires, the gNB 1 releases the conflicting secondary cell by using the first user identity. That the terminal device releases the conflicting secondary cell by using the first user identity may include when the first timer or the second timer expires, the terminal device releases the conflicting secondary cell by using the first user identity. The first timer is configured based on the second message, and configuration information of the second timer is predefined.

It is easy to understand that within validity time of the first timer or the second timer, the terminal device may communicate with the gNB 2 by using the second user identity.

Optionally, when the second message received by the terminal device includes the first time information, the terminal device may deactivate the conflicting secondary cell based on the indication of the first time information.

Figure 11:
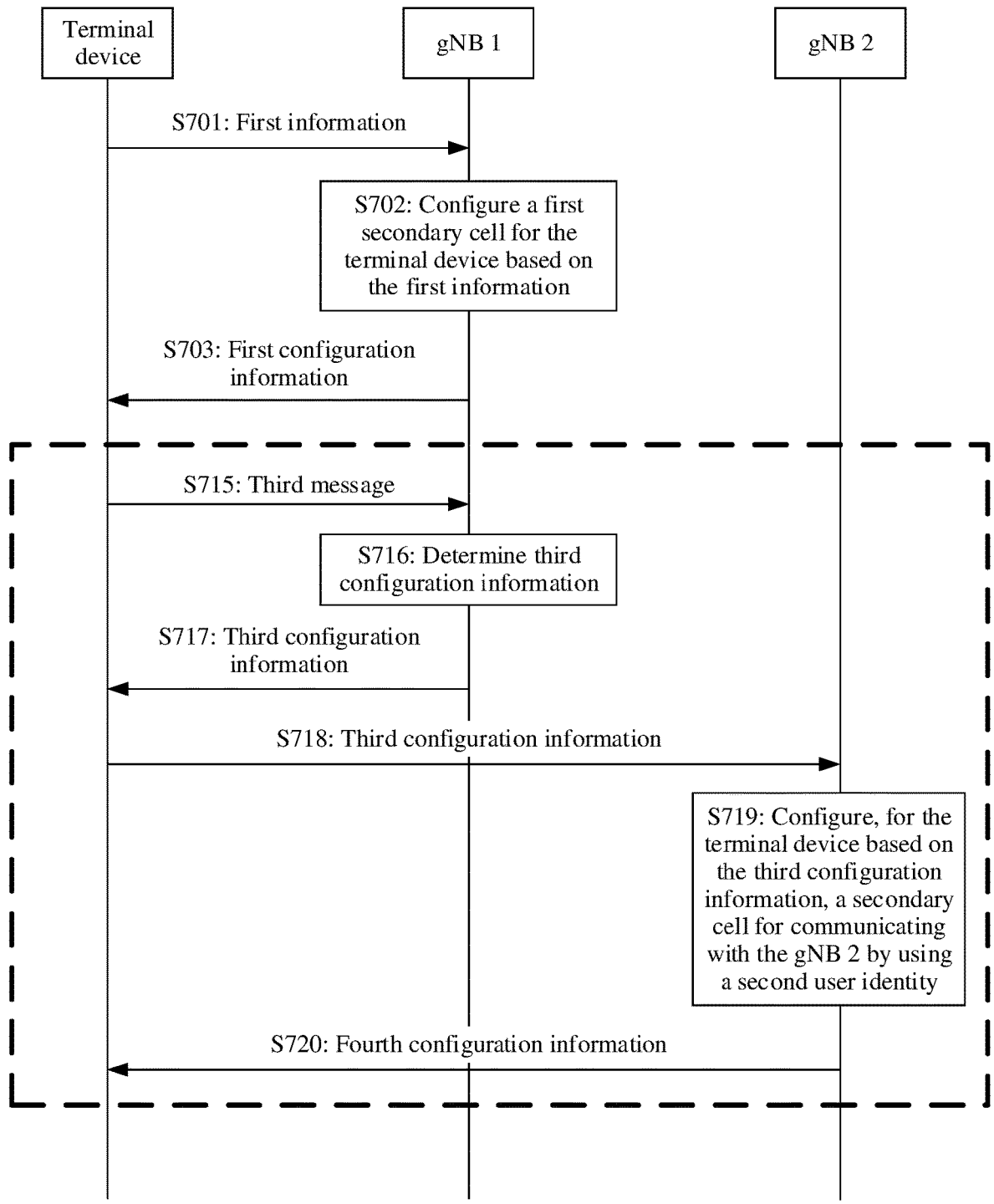
FIG. 11 is a fourth schematic flowchart of a communication method according to an embodiment of this application.

In an optional implementation of this embodiment of this application, after the terminal device accesses the second cell by using the second user identity, the gNB 2 may configure a secondary cell for the terminal device. In this case, the gNB 2 needs to negotiate a capability of the terminal device with the gNB 1 through the terminal device. For a negotiation process, refer to FIG. 11. To be specific, as shown in FIG. 11, the communication method provided in this embodiment of this application may further include the following steps S715 to S720.

S715: The terminal device sends a third message to the gNB 1 by using the first user identity, and the gNB 1 receives the third message from the terminal device.

The third message is for indicating that the terminal device is in the RRC connected state by using the second user identity. Alternatively, the third message is for indicating that the terminal device accesses the second cell by using the second user identity. It may be understood that, that the terminal device accesses the second cell by using the second user identity means that the terminal device is in the RRC connected state by using the second user identity.

Optionally, the third message may include capability information of the terminal device that is required by the gNB 2, for example, frequency band information and power information that are required by the gNB 2.

S716: The gNB 1 determines third configuration information, where the third configuration information is for updating the secondary cell in which the terminal device communicates with the gNB 1 by using the first user identity.

In a possible implementation, after receiving the third message from the terminal device, the gNB 1 may release a part of or all secondary cells in which the terminal device communicates with the gNB 1 by using the first user identity, or change power information of the part of or all the secondary cells.

Alternatively, in another possible implementation, if the third message includes the frequency band information and the power information that are required by the gNB 2, the secondary cell in which the terminal device communicates with the gNB 1 by using the first user identity may be updated based on the frequency band information and the power information that are required by the gNB 2. For example, the gNB 1 may release a part of secondary cells, and configure another secondary cell for the terminal device. For another example, the gNB 1 may change power information of a part of secondary cells.

S717: The gNB 1 sends the third configuration information to the terminal device, and the terminal device receives the third configuration information from the gNB 1 by using the first user identity.

S718: The terminal device sends the third configuration information to the gNB 2 by using the second user identity, and the gNB 2 receives the third configuration information from the terminal device.

S719: The gNB 2 configures, for the terminal device based on the third configuration information, a secondary cell for communicating with the gNB 2 by using the second user identity.

S720: The gNB 2 sends fourth configuration information to the terminal device, and the terminal device receives the fourth configuration information from the gNB 2.

The fourth configuration information includes information about the secondary cell in which the terminal device communicates with the gNB 2 by using the second user identity.

Optionally, in this embodiment of this application, before the terminal device sends the third message to the gNB 1 by using the first user identity (that is, step S715), the communication method provided in this embodiment of this application may further include the following.

The terminal device sends fifth configuration information to the gNB 2 by using the second user identity. The fifth configuration information includes information about a serving cell in which the terminal device communicates with the gNB 1 by using the first user identity. For example, the fifth configuration information may include frequency band information and power information of the serving cell. In other words, the terminal device reports, to the gNB 2, the information about the serving cell in which the terminal device communicates with the gNB 1 by using the first user identity.

Further, the gNB 2 receives the fifth configuration information from the terminal device, and sends a fourth message to the terminal device. The terminal device receives the fourth message from the gNB 2 by using the second user identity. The fourth message includes the frequency band information and/or the power information that are/is required by the gNB 2.

Based on the foregoing embodiment of this application, in the negotiation process between the gNB 2 and the gNB 1, a conflict between capabilities of the terminal device that are used by the gNB 2 and the gNB 1 may be avoided.

Figure 12:
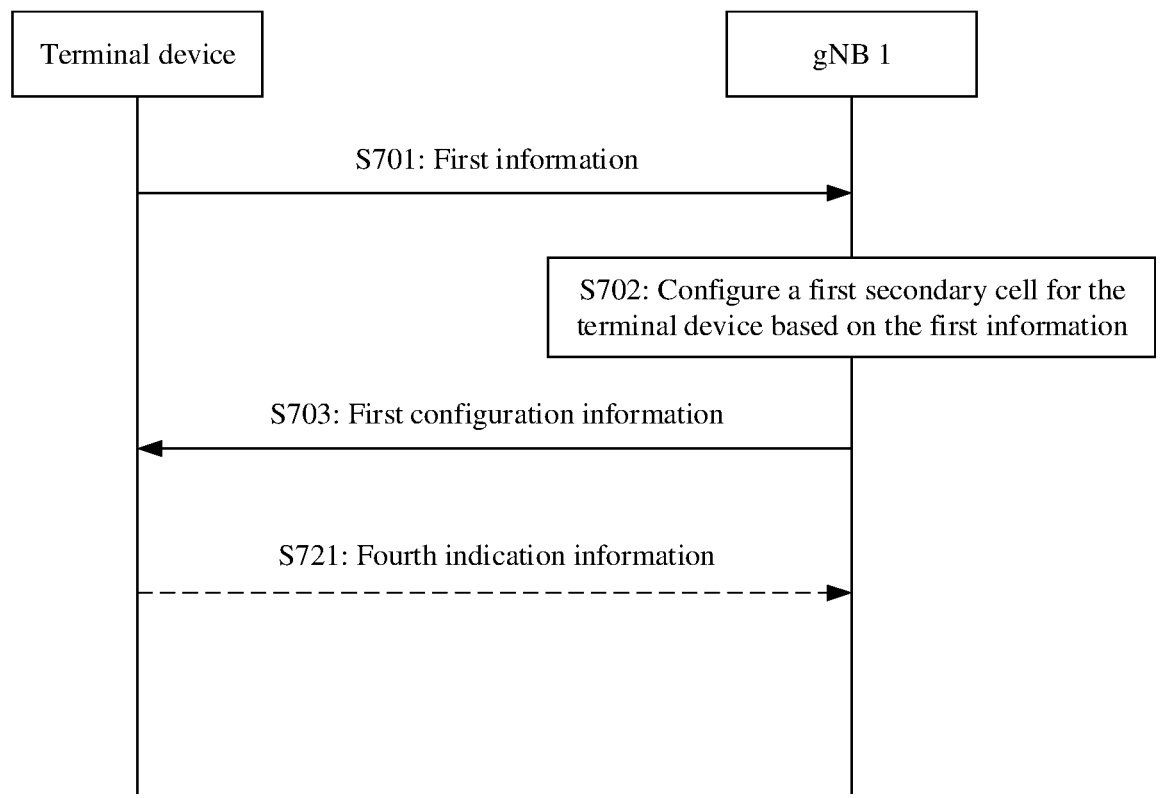
FIG. 12 is a fifth schematic flowchart of a communication method according to an embodiment of this application.

In an optional implementation of this embodiment of this application, as shown in FIG. 12, the communication method provided in this embodiment of this application may further include the following step S721.

S721: The terminal device sends fourth indication information to the gNB 1 by using the first user identity, and the gNB 1 receives the fourth indication information from the terminal device.

The fourth indication information is for indicating that the terminal device is in the RRC idle state by using the second user identity.

Based on this solution, when an RRC status corresponding to the second user identity of the terminal device changes, the terminal device reports an updated RRC status to the gNB 1 in time.

Figure 13:
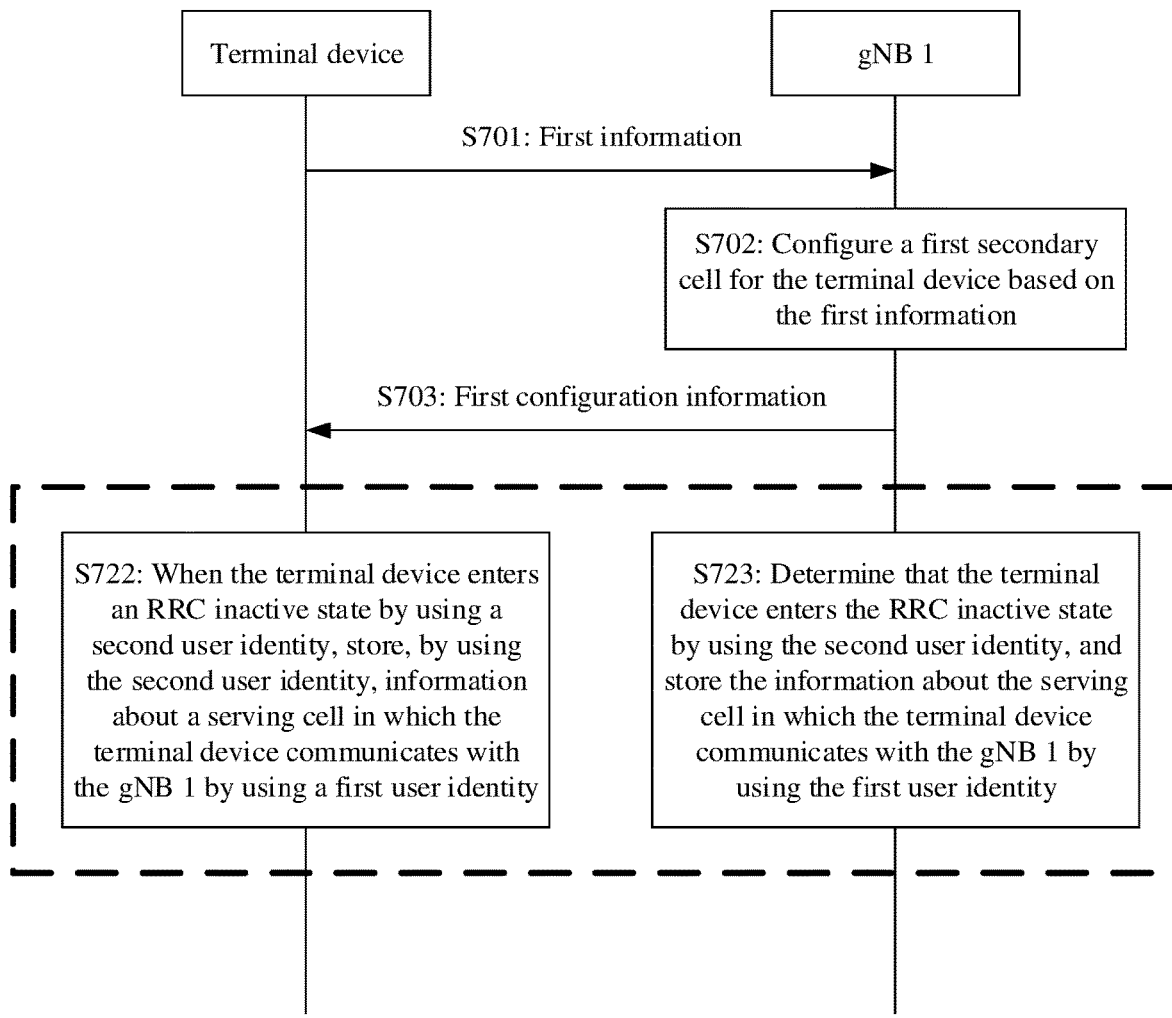
FIG. 13 is a sixth schematic flowchart of a communication method according to an embodiment of this application.

In an optional implementation of this embodiment of this application, as shown in FIG. 13, the communication method provided in this embodiment of this application may further include the following steps S722 and S723.

S722: When the terminal device enters the RRC inactive state by using the second user identity, the terminal device stores, by using the second user identity, the information about the serving cell in which the terminal device communicates with the gNB 1 by using the first user identity.

S723: The gNB 1 determines that the terminal device enters the RRC inactive state by using the second user identity, and stores the information about the serving cell in which the terminal device communicates with the gNB 1 by using the first user identity.

In other words, when the terminal device enters the RRC inactive state by using the second user identity, the terminal device and the gNB 1 may store the information about the serving cell in which the terminal device communicates with the gNB 1 by using the first user identity, for example, may store the information in a context of the terminal device. In this way, when the terminal device enters the RRC connected state by using the second user identity, a network side may directly configure a corresponding serving cell for the terminal device based on the information, stored in the context of the terminal device, about the serving cell in which the terminal device communicates with the gNB 1 by using the first user identity. Therefore, the terminal device does not need to transmit the information to the network side through an air interface, and time required for the terminal device to enter the connected state by using the second user identity can be reduced.

Figure 14:
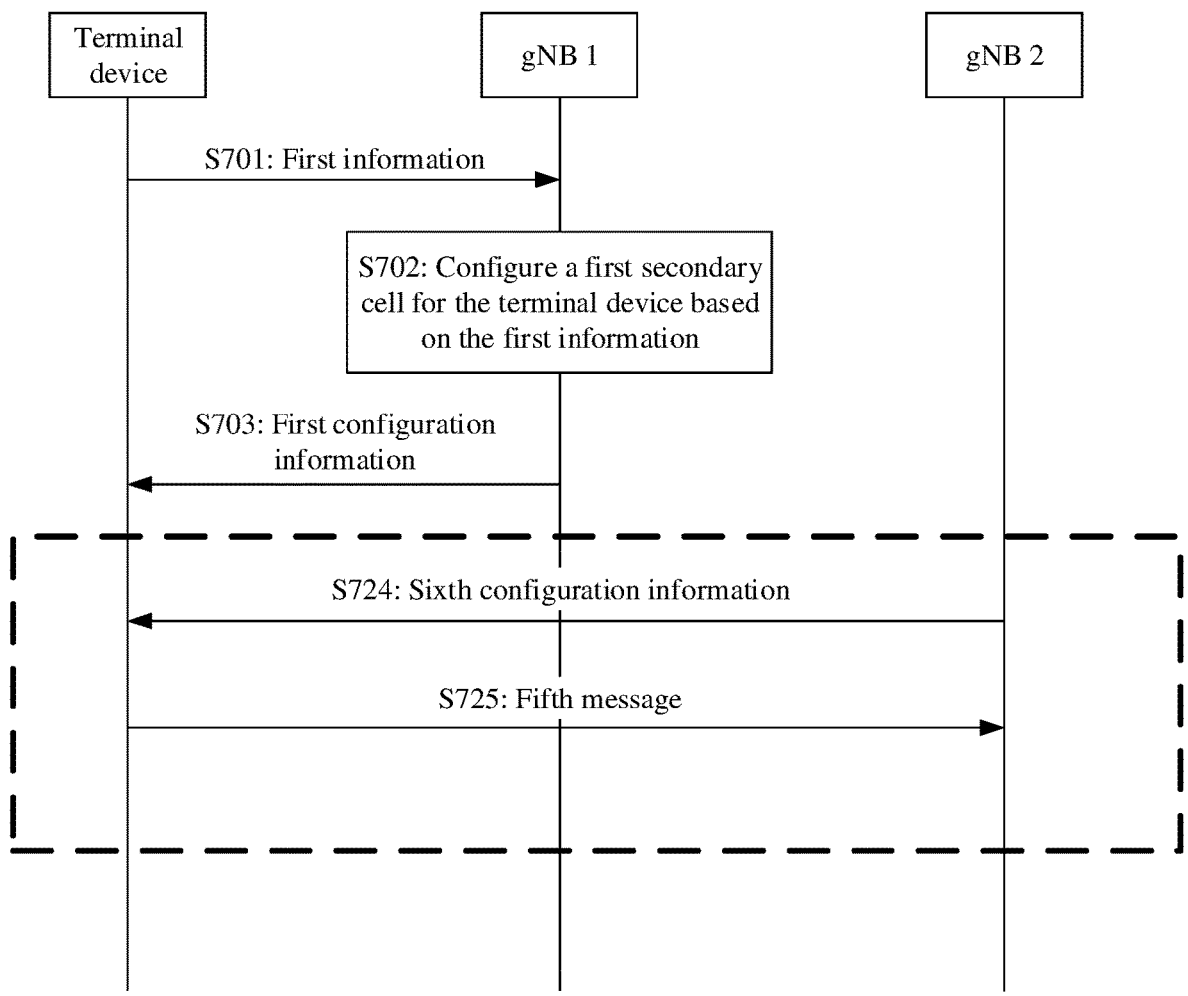
FIG. 14 is a seventh schematic flowchart of a communication method according to an embodiment of this application.

In an optional implementation of this embodiment of this application, to avoid a conflict between capabilities of the terminal device that are occupied by the two SIM cards, after receiving information about a secondary cell configured by the network side for the terminal device, the terminal device may first determine whether the configured secondary cell conflicts with a secondary cell corresponding to the other user identity. If the cells conflict, the terminal device does not validate the secondary cell, and reports, to the network side, that the secondary cell is not validated. To be specific, as shown in FIG. 14, the communication method provided in this embodiment of this application may further include the following steps S724 and S725.

S724: The gNB 2 sends sixth configuration information to the terminal device, and the terminal device receives the sixth configuration information from the gNB 2 by using the second user identity.

The sixth configuration information is for configuring a seventh cell as a secondary cell in which the terminal device communicates with the gNB 2 by using the second user identity.

S725: The terminal device sends a fifth message to the gNB 2 by using the second user identity, and the gNB 2 receives the fifth message from the terminal device.

The fifth message is for indicating that the seventh cell is not validated.

Optionally, the fifth message may include the information about the serving cell that is configured by the gNB 1 for the terminal device for communicating with the gNB 1 by using the first user identity.

Optionally, the fifth message may further indicate that a reason why the seventh cell is not validated is that the seventh cell conflicts with the serving cell that is configured by the gNB 1 for the terminal device for communicating with the gNB 1 by using the first user identity.

It should be noted that, in the foregoing embodiment of this application, implementation of related solutions described in steps S707 to S725 does not depend on the solution, described in steps S701 to S703, in which the gNB 1 configures the first secondary cell for the terminal device. In other words, the related solutions described in steps S707 to S725 may be independent embodiments.

Actions of the terminal device and the gNB in steps S701 to S725 may be performed by the processor 601 in the communication device 60 shown in FIG. 6 by invoking the application program code stored in the memory 603. This is not limited in this embodiment.

In addition, it should be further noted that, in the DC application scenario, interaction between the first access network device used as the primary station and the terminal device is similar to interaction between the gNB 1 and the terminal device in the foregoing CA application scenario. In addition, compared with the CA application scenario, in the DC application scenario, the first access network device used as the primary station further needs to notify the first access network device used as the secondary station of a terminal device capability (that is, the frequency band information corresponding to the second cell in this embodiment of this application) occupied by the terminal device by using the second user identity, so that the secondary station configures an SCG for the terminal device. For a specific implementation, refer to a related solution in which a primary station negotiates a UE capability with a secondary station in a dual connectivity technology. Details are not described in this embodiment of this application.

In addition, it should be noted that the embodiment shown in FIG. 7 and FIG. 9 to FIG. 14 is described by using an example in which the communication system shown in FIG. 2 is applied to the SA 5G network architecture shown in FIG. 4. If an example in which the communication system shown in FIG. 2 is applied to the 4G network architecture shown in FIG. 3 or the NSA 5G network architecture shown in FIG. 5 is used for description, a corresponding communication method is similar to the method in the foregoing embodiment, and only names of related network elements and names of messages exchanged between the network elements need to be adaptively replaced. Details are not described herein.

It may be understood that in the foregoing embodiment, a method and/or step implemented by the terminal device may alternatively be implemented by a component that may be used in the terminal device, a method and/or step implemented by the access network device may alternatively be implemented by a component that may be used in the access network device, and a method and/or step implemented by a core network device may alternatively be implemented by a component that may be used in the core network device.

The foregoing mainly describes the solutions provided in embodiments of this application from a perspective of interaction between network elements. Correspondingly, an embodiment of this application further provides a communication apparatus. The communication apparatus may be the terminal device in the foregoing method embodiment, an apparatus including the terminal device, or a component that may be used in the terminal device. Alternatively, the communication apparatus may be the first access network device in the foregoing method embodiment, an apparatus including the first access network device, or a component that may be used in the first access network device. It may be understood that, to implement the foregoing functions, the communication apparatus includes corresponding hardware structures and/or software modules for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 15:
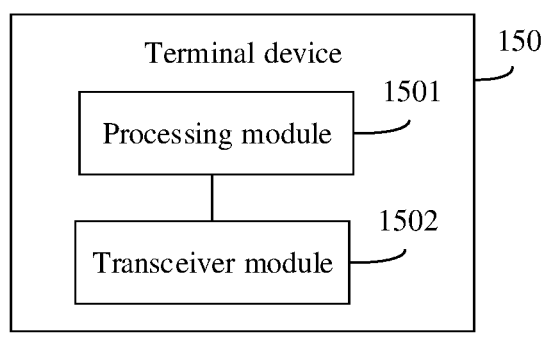
FIG. 15 is a schematic diagram of a structure of a terminal device according to an embodiment of this application.

For example, that the communication apparatus is the terminal device in the foregoing method embodiment is used as an example, and FIG. 15 is a schematic diagram of a structure of a terminal device 150. The terminal device 150 includes a processing module 1501 and a transceiver module 1502. The transceiver module 1502 may also be referred to as a transceiver unit, and is configured to implement sending and receiving functions. For example, the transceiver module 1502 may be a transceiver circuit, a transceiver machine, a transceiver, or a communication interface.

The processing module 1501 is configured to obtain first information. The transceiver module 1502 is configured to send the first information to a first access network device by using a first user identity. The transceiver module 1502 is further configured to receive first configuration information from the first access network device by using the first user identity.

Optionally, a first secondary cell includes a third cell and/or a fourth cell, where a frequency band corresponding to a first cell, a frequency band corresponding to a second cell, and a frequency band corresponding to the third cell are included in a first frequency band combination in a frequency band combination list, and a frequency band corresponding to the fourth cell is the same as the frequency band corresponding to the second cell. Alternatively, a first secondary cell includes a fifth cell, where a frequency band corresponding to the fifth cell and a frequency band corresponding to a first cell are included in a second frequency band combination in a frequency band combination list, and the second frequency band combination does not include a frequency band corresponding to a second cell.

Optionally, the transceiver module 1502 is further configured to receive second indication information from the first access network device by using the first user identity. Alternatively, the transceiver module 1502 is further configured to receive monitoring configuration information from the first access network device by using the first user identity.

Optionally, the transceiver module 1502 is further configured to send frequency band information of a sixth cell to the first access network device by using the first user identity, and receive second configuration information from the first access network device by using the first user identity.

Optionally, the transceiver module 1502 is further configured to send a first message to the first access network device by using the first user identity, and receive a second message from the first access network device by using the first user identity. The processing module 1501 is further configured to deactivate or release a conflicting secondary cell based on the second message by using the first user identity.

Optionally, the first message includes third indication information, and the third indication information is for indicating a reason for initiating random access and/or duration in which the terminal device 150 communicates with a second access network device by using a second user identity.

Optionally, that the processing module 1501 is further configured to release a conflicting secondary cell by using the first user identity includes when a first timer or a second timer expires, the processing module 1501 is configured to release the conflicting secondary cell by using the first user identity, where the first timer is configured based on the second message, and configuration information of the second timer is predefined.

Optionally, the second message includes first time information, and the first time information is for indicating time information used by the terminal device 150 to deactivate the conflicting secondary cell by using the first user identity.

Optionally, the transceiver module 1502 is further configured to send a third message to the first access network device by using the first user identity, where the third message is for indicating that the terminal device 150 is in an RRC connected state by using the second user identity, the transceiver module 1502 is further configured to receive third configuration information from the first access network device by using the first user identity, and the transceiver module 1502 is further configured to send the third configuration information to the second access network device by using the second user identity, and receive fourth configuration information from the second access network device.

Optionally, the third message may include frequency band information and power information that are required by the second access network device. The transceiver module 1502 is further configured to before sending the third message to the first access network device by using the first user identity, send fifth configuration information to the second access network device by using the second user identity, and the transceiver module 1502 is further configured to receive a fourth message from the second access network device by using the second user identity.

Optionally, the transceiver module 1502 is further configured to send fourth indication information to the first access network device by using the first user identity, where the fourth indication information is for indicating that the terminal device 150 is in an RRC idle state by using the second user identity.

Optionally, the processing module 1501 is further configured to when the terminal device 150 enters an RRC inactive state by using the second user identity, store, by using the second user identity, information about a serving cell in which the terminal device 150 communicates with the first access network device by using the first user identity.

Optionally, the transceiver module 1502 is further configured to receive sixth configuration information from the second access network device by using the second user identity, where the sixth configuration information is for configuring a seventh cell as a secondary cell in which the terminal device 150 communicates with the second access network device by using the second user identity, and the transceiver module 1502 is further configured to send a fifth message to the second access network device, where the fifth message is for indicating that the seventh cell is not validated.

All related content of the steps in the foregoing method embodiment may be cited in function descriptions of corresponding function modules. Details are not described herein again.

In this embodiment, the terminal device 150 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the terminal device 150 may be in a form of the communication apparatus 60 shown in FIG. 6.

For example, the processor 601 in the communication apparatus 60 shown in FIG. 6 may invoke the computer-executable instructions stored in the memory 603, to enable the communication apparatus 60 to perform the communication method in the foregoing method embodiment.

Specifically, functions/implementation processes of the processing module 1501 and the transceiver module 1502 in FIG. 15 may be implemented by the processor 601 in the communication apparatus 60 shown in FIG. 6 by invoking the computer-executable instructions stored in the memory 603. Alternatively, a function/an implementation process of the processing module 1501 in FIG. 15 may be implemented by the processor 601 in the communication apparatus 60 shown in FIG. 6 by invoking the computer-executable instructions stored in the memory 603, a function/an implementation process of the transceiver module 1502 in FIG. 15 may be implemented by using the communication interface 604 in the communication apparatus 60 shown in FIG. 6.

Because the terminal device 150 provided in this embodiment may perform the communication method provided in the embodiment shown in FIG. 7 and FIG. 9 to FIG. 14, for technical effects that can be achieved by the terminal device 150, refer to the foregoing method embodiment. Details are not described herein again.

Figure 16:
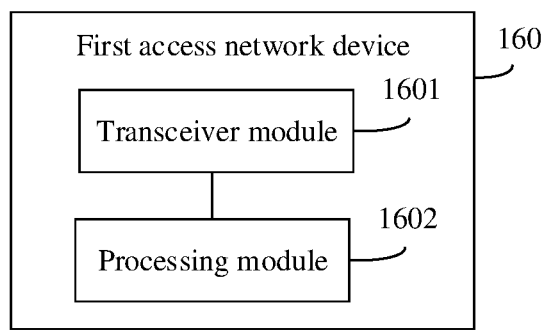
FIG. 16 is a schematic diagram of a structure of a first access network device according to an embodiment of this application.

Alternatively, for example, that the communication apparatus is the access network device in the foregoing method embodiment is used as an example, and FIG. 16 is a schematic diagram of a structure of a first access network device 160. The first access network device 160 includes a transceiver module 1601 and a processing module 1602. The transceiver module 1601 may also be referred to as a transceiver unit, and is configured to implement sending and receiving functions. For example, the transceiver module 1601 may be a transceiver circuit, a transceiver machine, a transceiver, or a communication interface.

The transceiver module 1601 is configured to receive first information from a terminal device. The processing module 1602 is adapted to configure a first secondary cell for the terminal device based on the first information. The transceiver module 1601 is further configured to send first configuration information to the terminal device, where the first configuration information includes information about the first secondary cell.

Optionally, the first secondary cell includes a third cell and/or a fourth cell, where a frequency band corresponding to a first cell, a frequency band corresponding to a second cell, and a frequency band corresponding to the third cell are included in a first frequency band combination in a frequency band combination list, and a frequency band corresponding to the fourth cell is the same as the frequency band corresponding to the second cell. Alternatively, the first secondary cell includes a fifth cell, where a frequency band corresponding to the fifth cell and a frequency band corresponding to a first cell are included in a second frequency band combination in a frequency band combination list, and the second frequency band combination does not include a frequency band corresponding to a second cell.

Optionally, the first information further includes paging moment information used by a second access network device to send a paging message to the terminal device, and the second access network device is an access network device to which the second cell belongs.

Optionally, the processing module 1602 is further configured to stop, at a first paging moment, performing downlink scheduling for the terminal device in a conflicting secondary cell. Alternatively, the transceiver module 1601 is further configured to send second indication information to the terminal device, where the second indication information is for indicating the terminal device to stop monitoring a physical downlink control channel at a first paging moment by using a first user identity. Alternatively, the transceiver module 1601 is further configured to send monitoring configuration information to the terminal device.

Optionally, the transceiver module 1601 is further configured to receive frequency band information of a sixth cell from the terminal device, the processing module 1602 is further adapted to configure a second secondary cell for the terminal device based on the frequency band information of the sixth cell, and the transceiver module 1601 is further configured to send second configuration information to the terminal device, where the second configuration information includes information about the second secondary cell.

Optionally, the transceiver module 1601 is further configured to receive a first message from the terminal device, where the first message is for requesting to randomly access the second cell by using a second user identity, the processing module 1602 is further configured to deactivate or release the conflicting secondary cell, and the transceiver module 1601 is further configured to send a second message to the terminal device, where the second message is for indicating the terminal device to deactivate or release the conflicting secondary cell by using the first user identity.

Optionally, the first message includes third indication information, and the third indication information is for indicating a reason for initiating random access and/or duration in which the terminal device communicates with the second access network device by using the second user identity, and the processing module 1602 is further configured to before deactivating or releasing the conflicting secondary cell, determine, based on the third indication information, to deactivate or release the conflicting secondary cell.

Optionally, that the processing module 1602 is further configured to release the conflicting secondary cell includes when a first timer or a second timer expires, the processing module 1602 is configured to release the conflicting secondary cell, where the first timer is configured based on the second message, and configuration information of the second timer is predefined.

Optionally, the second message includes first time information, and the first time information is for indicating time information used by the terminal device to deactivate the conflicting secondary cell by using the first user identity.

Optionally, the transceiver module 1601 is further configured to receive a third message from the terminal device, where the third message is for indicating that the terminal device is in an RRC connected state by using the second user identity, and the processing module 1602 is further configured to determine third configuration information based on the third message, and send the third configuration information to the terminal device, where the third configuration information is for updating the secondary cell in which the terminal device communicates with the first access network device by using the first user identity.

Optionally, the transceiver module 1601 is further configured to receive fourth indication information from the terminal device, where the fourth indication information is for indicating that the terminal device is in an RRC idle state by using the second user identity.

Optionally, the processing module 1602 is further configured to determine that the terminal device enters an RRC inactive state by using the second user identity, and store information about a serving cell in which the terminal device communicates with the first access network device by using the first user identity.

All related content of the steps in the foregoing method embodiment may be cited in function descriptions of corresponding function modules. Details are not described herein again.

In this embodiment, the first access network device 160 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the first access network device 160 may be in a form of the communication apparatus 60 shown in FIG. 6.

For example, the processor 601 in the communication apparatus 60 shown in FIG. 6 may invoke the computer-executable instructions stored in the memory 603, to enable the communication apparatus 60 to perform the communication method in the foregoing method embodiment.

Specifically, functions/implementation processes of the processing module 1602 and the transceiver module 1601 in FIG. 16 may be implemented by the processor 601 in the communication apparatus 60 shown in FIG. 6 by invoking the computer-executable instructions stored in the memory 603. Alternatively, a function/an implementation process of the processing module 1602 in FIG. 16 may be implemented by the processor 601 in the communication apparatus 60 shown in FIG. 6 by invoking the computer-executable instructions stored in the memory 603, a function/an implementation process of the transceiver module 1601 in FIG. 16 may be implemented by using the communication interface 604 in the communication apparatus 60 shown in FIG. 6.

Because the first access network device 160 provided in this embodiment may perform the communication method provided in the embodiment shown in FIG. 7 and FIG. 9 to FIG. 14, for technical effects that can be achieved by the first access network device 160, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions and implement the foregoing method procedure. The processor may be built into a SoC (system-on-a-chip) or an ASIC, or may be an independent semiconductor chip. In addition to a core configured to perform calculation or processing by executing software instructions, the processor may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete component, and the hardware may run necessary software or does not depend on software to perform the foregoing method procedure.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include the memory. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A communication method, comprising:
sending, by a terminal device that supports a first user identity and a second user identity, first information to a first access network device using the first user identity, wherein the first access network device is an access network device to which a first cell belongs, wherein the first cell is a primary cell in which the terminal device communicates with the first access network device using the first user identity, wherein the first information comprises first indication information, a frequency band combination list supported by the terminal device, a radio resource control (RRC) status of the terminal device in a second cell, and frequency band information of the second cell, wherein the second cell is a cell on which the terminal device camps using the second user identity, and wherein the first indication information indicates that the first user identity and the second user identity that are supported by the terminal device share capabilities of the terminal device; and receiving first configuration information from the first access network device using the first user identity, wherein the first configuration information comprises information about a first secondary cell, and wherein the first secondary cell is a secondary cell in which the terminal device communicates with the first access network device using the first user identity.

2. The method according to claim 1, wherein at least one of:
the first secondary cell comprises at least one of a third cell or a fourth cell, wherein a frequency band corresponding to the first cell, a frequency band corresponding to the second cell, and a frequency band corresponding to the third cell are in a first frequency band combination in the frequency band combination list, and wherein a frequency band corresponding to the fourth cell is the same as the frequency band corresponding to the second cell; or the first secondary cell comprises a fifth cell, wherein a frequency band corresponding to the fifth cell and the frequency band corresponding to the first cell are in a second frequency band combination in the frequency band combination list, and wherein the second frequency band combination does not comprise the frequency band corresponding to the second cell.

3. The method according to claim 1, further comprising:
sending frequency band information of a sixth cell to the first access network device using the first user identity, wherein the sixth cell is a cell on which the terminal device camps after performing cell reselection using the second user identity; and receiving second configuration information from the first access network device using the first user identity, wherein the second configuration information comprises information about a second secondary cell, and wherein the second secondary cell is a secondary cell in which the terminal device communicates with the first access network device using the first user identity.

4. The method according to claim 1, further comprising:
sending a first message to the first access network device using the first user identity, wherein the first message requests to randomly access the second cell using the second user identity;

receiving a second message from the first access network device using the first user identity, wherein the second message indicates to the terminal device to deactivate or release a conflicting secondary cell using the first user identity, and wherein the conflicting secondary cell is one or more cells, in the first secondary cell, that conflict with the second cell; and performing at least one of deactivating or releasing the conflicting secondary cell based on the second message using the first user identity.

5. The method according to claim 4, wherein the first message comprises third indication information, and wherein the third indication information indicates at least one of a reason for initiating random access or a duration in which the terminal device communicates with a second access network device using the second user identity.

6. The method according to claim 1, further comprises:
sending a third message to the first access network device using the first user identity, wherein the third message is for indicating that the terminal device is in an RRC connected state using the second user identity;
receiving third configuration information from the first access network device using the first user identity, wherein the third configuration information is associated with updating the secondary cell in which the terminal device communicates with the first access network device using the first user identity;
sending the third configuration information to a second access network device using the second user identity; and
receiving fourth configuration information from the second access network device, wherein the fourth configuration information comprises information about a secondary cell in which the terminal device communicates with the second access network device using the second user identity.

7. The method according to claim 6, wherein the third message comprises frequency band information and power information that are required by the second access network device; and
wherein the method further comprises performing, before sending the third message to the first access network device using the first user identity:
sending fifth configuration information to the second access network device using the second user identity, wherein the fifth configuration information comprises information about a serving cell in which the terminal device communicates with the first access network device using the first user identity; and
receiving a fourth message from the second access network device using the second user identity, wherein the fourth message comprises at least one of the frequency band information or the power information required by the second access network device.

8. The method according to claim 1, further comprising:
storing, in response to the terminal device entering an RRC inactive state using the second user identity, using the second user identity, the information about a serving cell in which the terminal device communicates with the first access network device using the first user identity.

9. A communication method, comprising:
receiving, by a first access network device, first information from a terminal device, wherein the first information comprises first indication information, a frequency band combination list supported by the terminal device, a radio resource control (RRC) status of the terminal device in a second cell, and frequency band information of the second cell, wherein the terminal device supports a first user identity and a second user identity, wherein the second cell is a cell on which the terminal device camps using the second user identity, and wherein the first indication information indicates that the first user identity and the second user identity that are supported by the terminal device share capabilities of the terminal device;
configuring a first secondary cell for the terminal device based on the first information, wherein the first secondary cell is a secondary cell in which the terminal device communicates with the first access network device using the first user identity; and
sending first configuration information to the terminal device, wherein the first configuration information comprises information about the first secondary cell.

10. The method according to claim 9, wherein at least one of:
the first secondary cell comprises at least one of a third cell or a fourth cell, wherein a frequency band corresponding to a first cell, a frequency band corresponding to the second cell, and a frequency band corresponding to the third cell are in a first frequency band combination in the frequency band combination list, and wherein a frequency band corresponding to the fourth cell is the same as the frequency band corresponding to the second cell; or
the first secondary cell comprises a fifth cell, wherein a frequency band corresponding to the fifth cell and the frequency band corresponding to the first cell are in a second frequency band combination in the frequency band combination list, and wherein the second frequency band combination does not comprise the frequency band corresponding to the second cell.

11. The method according to claim 9, further comprises:
receiving frequency band information of a sixth cell from the terminal device, wherein the sixth cell is a cell on which the terminal device camps after performing cell reselection using the second user identity;
configuring a second secondary cell for the terminal device based on the frequency band information of the sixth cell, wherein the second secondary cell is a secondary cell in which the terminal device communicates with the first access network device using the first user identity; and
sending second configuration information to the terminal device, wherein the second configuration information comprises information about the second secondary cell.

12. The method according to claim 9, further comprising:
receiving a first message from the terminal device, wherein the first message requests to randomly access the second cell using the second user identity; and
performing at least one of deactivating or releasing a conflicting secondary cell, and sending a second message to the terminal device, wherein the second message indicates to the terminal device to deactivate or release the conflicting secondary cell using the first user identity, and wherein the conflicting secondary cell is one or more cells, in the first secondary cell, that conflict with the second cell.

13. The method according to claim 9, further comprises:
receiving a third message from the terminal device, wherein the third message indicates that the terminal device is in an RRC connected state using the second user identity;
determining third configuration information based on the third message; and
sending the third configuration information to the terminal device, wherein the third configuration information is associated with updating the secondary cell in which the terminal device communicates with the first access network device using the first user identity.

14. The method according to claim 9, further comprising:
receiving fourth indication information from the terminal device, wherein the fourth indication information indicates that the terminal device is in an RRC idle state using the second user identity.

15. The method according to claim 9, further comprising:
determining that the terminal device enters an RRC inactive state using the second user identity; and
storing information about a serving cell in which the terminal device communicates with the first access network device using the first user identity.

16. An apparatus, comprising:
one or more processors; and
one or more non-transitory memories coupled to the one or more processors and storing programming instructions for execution by the one or more processors, the programming instructions including instructions for acting as a terminal device, and:
sending first information to a first access network device using a first user identity, wherein the first access network device is an access network device to which a first cell belongs, wherein the first cell is a primary cell in which the terminal device communicates with the first access network device using the first user identity, wherein the first information comprises first indication information, a frequency band combination list supported by the terminal device, a radio resource control (RRC) status of the terminal device in a second cell, and frequency band information of the second cell, wherein the second cell is a cell on which the terminal device camps using a second user identity, and wherein the first indication information indicates that the first user identity and the second user identity that are supported by the terminal device share capabilities of the terminal device; and
receiving first configuration information from the first access network device using the first user identity, wherein the first configuration information comprises information about a first secondary cell, and wherein the first secondary cell is a secondary cell in which the terminal device communicates with the first access network device using the first user identity.

17. The apparatus according to claim 16, wherein at least one of:
the first secondary cell comprises at least one of a third cell or a fourth cell, wherein a frequency band corresponding to the first cell, a frequency band corresponding to the second cell, and a frequency band corresponding to the third cell are in a first frequency band combination in the frequency band combination list, and wherein a frequency band corresponding to the fourth cell is the same as the frequency band corresponding to the second cell; or
the first secondary cell comprises a fifth cell, wherein a frequency band corresponding to the fifth cell and the frequency band corresponding to the first cell are in a second frequency band combination in the frequency band combination list, and wherein the second frequency band combination does not comprise the frequency band corresponding to the second cell.

18. The apparatus according to claim 16, wherein the programming instructions further include instructions for:
sending frequency band information of a sixth cell to the first access network device using the first user identity, wherein the sixth cell is a cell on which the terminal device camps after performing cell reselection using the second user identity; and
receiving second configuration information from the first access network device using the first user identity, wherein the second configuration information comprises information about a second secondary cell, and wherein the second secondary cell is a secondary cell in which the terminal device communicates with the first access network device using the first user identity.

19. The apparatus according to claim 16, wherein the programming instructions further include instructions for:
sending a first message to the first access network device using the first user identity, wherein the first message requests to randomly access the second cell using the second user identity;
receiving a second message from the first access network device using the first user identity, wherein the second message is for indicating the terminal device to deactivate or release a conflicting secondary cell using the first user identity, and wherein the conflicting secondary cell is one or more cells, in the first secondary cell, that conflict with the second cell; and
deactivating or releasing the conflicting secondary cell based on the second message using the first user identity.

20. The apparatus according to claim 19, wherein the first message comprises third indication information, and wherein the third indication information indicates at least one of a reason for initiating random access or a duration in which the terminal device communicates with a second access network device using the second user identity.

* * * * *

UNITED STATES PATENT AND TRADEMARK OFFICE
CERTIFICATE OF CORRECTION

PATENT NO. : 12,267,904 B2
APPLICATION NO. : 17/891359
DATED : April 1, 2025
INVENTOR(S) : Wang et al.

Page 1 of 1

It is certified that error appears in the above-identified patent and that said Letters Patent is hereby corrected as shown below:

In the Claims

In Column 47, in Claim 6, Line 10, delete "comprises:" and insert -- comprising: --.

In Column 48, in Claim 11, Line 30, delete "comprises:" and insert -- comprising: --.

In Column 48, in Claim 13, Line 56, delete "comprises:" and insert -- comprising: --.

Signed and Sealed this
Thirteenth Day of May, 2025

Coke Morgan Stewart
*Acting Director of the United States Patent and Trademark Office*